United States Patent

Croxford

(10) Patent No.: US 10,372,195 B2
(45) Date of Patent: Aug. 6, 2019

(54) DATA PROCESSING

(71) Applicant: ARM Limited, Cambridge (GB)

(72) Inventor: Daren Croxford, Swaffham Prior (GB)

(73) Assignee: Arm Limited, Cambridge (GB)

( * ) Notice: Subject to any disclaimer, the term of this patent is extended or adjusted under 35 U.S.C. 154(b) by 190 days.

(21) Appl. No.: 15/467,035

(22) Filed: Mar. 23, 2017

(65) Prior Publication Data

US 2017/0285725 A1 Oct. 5, 2017

(30) Foreign Application Priority Data

Mar. 30, 2016 (GB) .................................. 1605349.8

(51) Int. Cl.
G06T 1/60 (2006.01)
G09G 5/00 (2006.01)
G06F 1/3234 (2019.01)
G06N 5/04 (2006.01)
G06T 1/20 (2006.01)
G06T 15/00 (2011.01)

(52) U.S. Cl.
CPC ............ G06F 1/3265 (2013.01); G06N 5/04 (2013.01); G06T 1/20 (2013.01); G06T 1/60 (2013.01); G06T 15/005 (2013.01); *G06T 2200/28* (2013.01)

(58) Field of Classification Search
CPC .... G06T 1/60; G06T 1/00; G06T 3/40; G09G 5/393; G09G 2360/122; G09G 5/001; G09G 2360/18; G09G 2360/12; H04N 19/176
See application file for complete search history.

(56) References Cited

U.S. PATENT DOCUMENTS

| 2010/0231721 | A1* | 9/2010 | Meloche | ................ | G08G 5/065 348/159 |
| 2011/0074800 | A1* | 3/2011 | Stevens | ................... | G06T 11/40 345/545 |
| 2011/0148892 | A1* | 6/2011 | Shreiner | ................ | G06T 11/40 345/545 |
| 2015/0084982 | A1 | 3/2015 | Croxford | | |

(Continued)

FOREIGN PATENT DOCUMENTS

GB 2521170 6/2015

OTHER PUBLICATIONS

Combined Search and Examination Report dated Sep. 22, 2016, GB Patent Application GB1605349.8.

*Primary Examiner* — Ke Xiao
*Assistant Examiner* — Andrew Shin
(74) *Attorney, Agent, or Firm* — Vierra Magen Marcus LLP

(57) ABSTRACT

A data processing apparatus comprises processing circuitry configured to predict whether a region of output data to be generated by the apparatus for a current set of output data will be similar to a region of output data generated and stored in memory for a previous set of output data. When it is predicted that the new region of output data will be similar to the previous region of output data, the new region of output data is prevented from being generated and the previous region of output data is used for the current set of output data instead. The data processing apparatus can provide a way to avoid generating areas of sets of output data that are static from one set of output data to the next.

18 Claims, 12 Drawing Sheets

(56) References Cited

U.S. PATENT DOCUMENTS

| | | |
|---|---|---|
| 2015/0084983 A1 | 3/2015 | Croxford |
| 2015/0091892 A1 | 4/2015 | Kwon |
| 2015/0187123 A1 | 7/2015 | Hwang |
| 2016/0004917 A1* | 1/2016 | Yoshida ................ A61B 90/36 382/115 |
| 2016/0267716 A1* | 9/2016 | Patel ..................... G09G 5/395 |

* cited by examiner

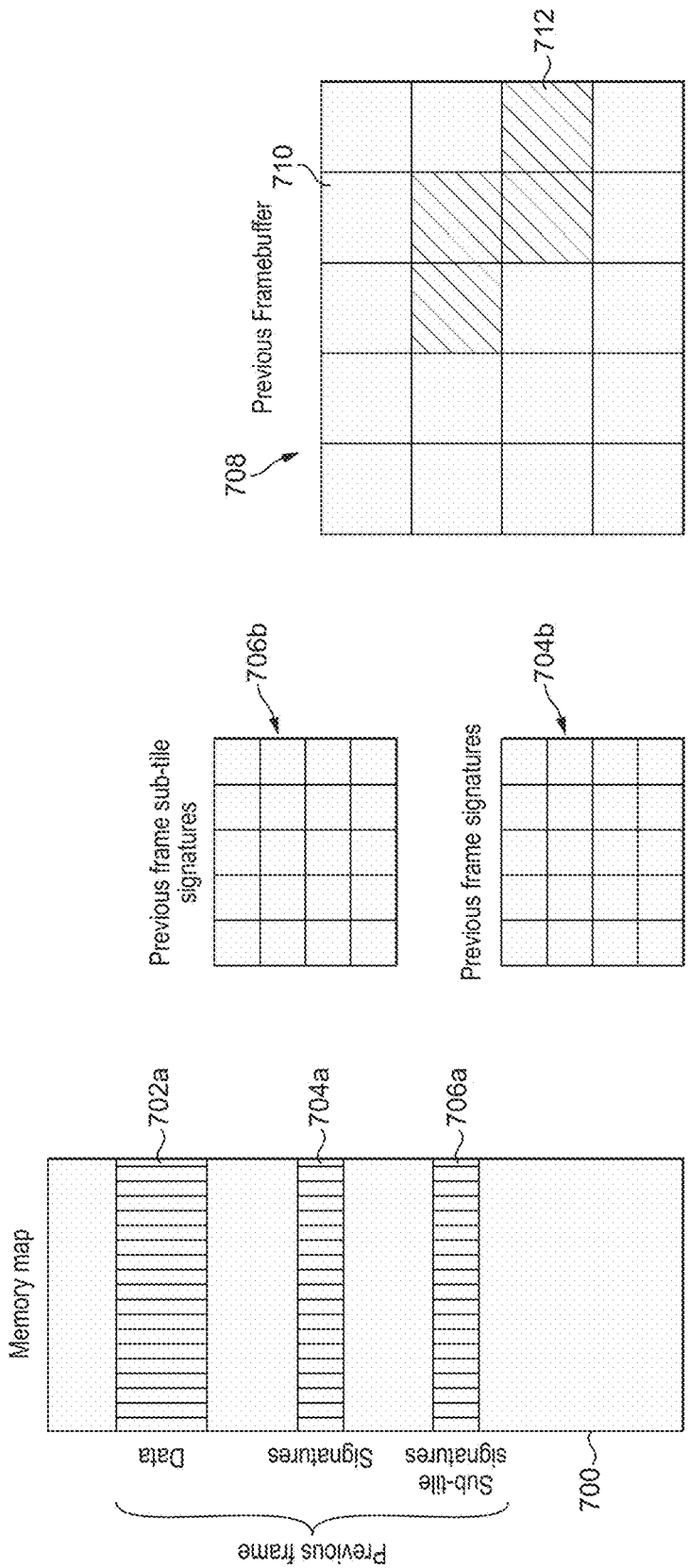

DATA PROCESSING

BACKGROUND

The technology described herein relates to data processing methods and apparatus in which sets of output data are to be generated by a data processing apparatus.

A data output to be generated by a data processing apparatus, e.g. a graphics output to be generated by a graphics processing system, is often generated as a sequence of plural sets of output data, e.g. plural frames of graphics data.

Each set of output data, e.g. frame, may be generated by a graphics processor of the system and then written to a so-called "frame buffer" in memory when it is ready for use, e.g. display. The frame buffer may then be read, e.g. by a display controller, and output, e.g. to a display (such as a screen or a printer), for use, e.g. for display.

Generating sets of output data often consumes a significant amount of processing power. Writing sets of output data to a frame buffer also often consumes a significant amount of processing power and memory bandwidth, particularly where, as is often the case, the frame buffer resides in a memory that is external to the graphics processor.

For example, in the case of a graphics output to be displayed, frames of graphics data may need to be generated and written to memory at a rate of 48 frames per second or higher, and each frame can require a significant amount of graphics data to be generated, particularly for higher resolution displays and high definition (HD) graphics.

In data processing apparatus, e.g. of portable devices, it is generally desirable to try to reduce the amount of processing resources needed to generate sets of output data, e.g. so as to reduce power consumption, increase processing speed and/or decrease memory bandwidth consumption, but without a corresponding undesirable reduction in the quality of the data output.

The Applicants believe that there remains scope for improvements to data processing methods and apparatus in which sets of output data are to be generated by a data processing apparatus.

BRIEF DESCRIPTION OF THE DRAWINGS

Various embodiments of the technology described herein will now be described by way of example only and with reference to the accompanying drawings, in which:

FIGS. 7A-C show the contents of a memory of a data processing apparatus according to an embodiment of the technology described herein;

Figure 1:
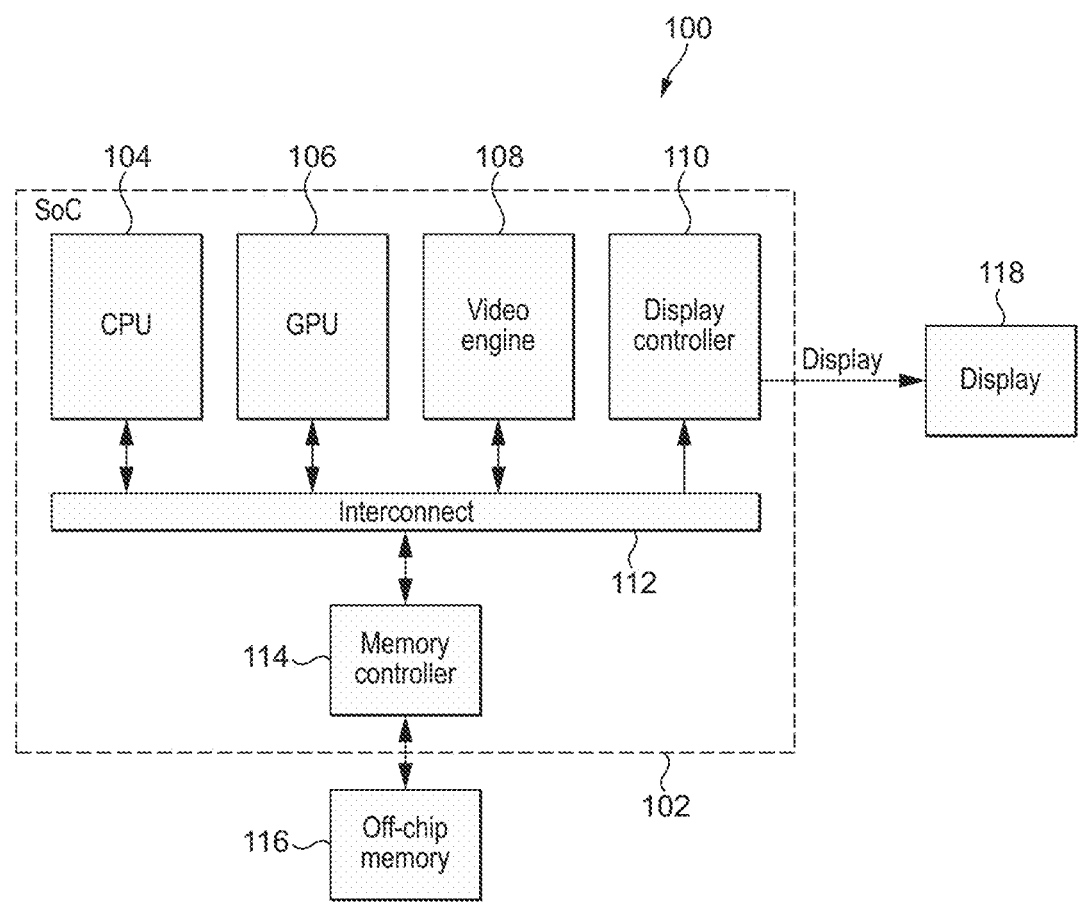
FIG. 1 shows an overview of a data processing apparatus according to an embodiment of the technology described herein.

The drawings show elements of a data processing apparatus that are relevant to embodiments of the technology described herein. As will be appreciated by those skilled in the art there may be other elements of the data processing apparatus that are not illustrated in the drawings. It should also be noted here that the drawings are only schematic, and that, for example, in practice the shown elements may share significant hardware circuits, even though they are shown schematically as separate elements in the drawings.

DETAILED DESCRIPTION

An embodiment of the technology described herein comprises a method of operating a data processing apparatus, the method comprising:

predicting whether a region of output data to be generated by the apparatus for a current set of output data will be similar to a region of output data that has been generated for a previous set of output data and stored in a memory for the previous set of output data; and when it is predicted that a particular region of output data to be generated by the apparatus for the current set of output data will be similar to a particular region of output data generated for the previous set of output data, preventing the particular region of output data from being generated for the current set of output data and using the particular region of output data generated for the previous set of output data as the particular region of output data for the current set of output data.

Another embodiment of the technology described herein comprises a data processing apparatus, the apparatus comprising:

write controller circuitry configured to store output data generated by the apparatus in a memory; and processing circuitry configured to:

predict whether a region of output data to be generated by the apparatus for a current set of output data will be similar to a region of output data that has been generated for a previous set of output data and stored in the memory for the previous set of output data; and when it is predicted that a particular region of output data to be generated by the apparatus for the current set of output data will be similar to a particular region of output data generated for the previous set of output data, prevent the particular region of output data from being generated for the current set of output data and use the particular region of output data generated for the previous set of output data as the particular region of output data for the current set of output data.

The Applicants have recognised that some regions of output data can comprise similar (e.g. the same or substantially the same) output data from one set of output data to the next. For example, substantially static user interfaces often comprise areas that remain the same for plural sets of output data (e.g. for plural frames of graphics data for display). Similarly, sets of imported data (e.g. frames of imported video data) to be incorporated into sets of output data (e.g. frames of graphics data for display) often have a relatively lower update rate (e.g. frame rate) than the rate at which sets of output data are being generated by the apparatus, and thus areas of sets of composited output data that comprise the imported data can, for example, remain substantially static for plural successive sets of output data (e.g. for plural frames of graphics data).

The technology described herein accordingly comprises predicting whether a region of output data that has not yet been generated for a current set of output data will be similar to a region of output data generated for a previous set of output data. When it is predicted that those regions will be similar, the region to be generated for the current set of output data is prevented from being generated for the current set of output data and the region of output data that was generated for the previous set of output data is used, for example output, e.g. for display, instead.

The technology described herein can therefore avoid the need, for example, to generate a region of output data for the current set of output data for an area that is likely to remain unchanged. The technology described herein can accordingly result in a more efficient use of processing resources since some areas of output data need not be regenerated plural times for subsequent sets of output data. The technology described herein can also, for example, reduce the amount of memory bandwidth that is used since some regions of output data are not generated and therefore do not need to be written out to memory plural times for subsequent sets of output data. Furthermore, since some regions of output data are not generated, less input data may need to be read from memory in order to process the regions of output data.

What constitutes "similar" in embodiments of the technology described herein may be selected as desired.

For example, in some embodiments, a region of output data to be generated for the current set of output data may be predicted to be similar to a region of output data generated for the previous set of output data when the region of output data to be generated for the current set of output data is predicted to be substantially the same as the region of output data generated for the previous set of output data, e.g. when the regions of output data are predicted to have acceptable or visually imperceptible differences.

In other embodiments, a region of output data to be generated for the current set of output data may be predicted to be similar to a region of output data generated for the previous set of output data only when the region of output data to be generated for the current set of output data is predicted to be identical to the region of output data generated for the previous set of output data.

The region of output data to be generated for the current set of output data and the region of output data generated for the previous set of output data may correspond in terms of position in the desired output, i.e. the region of output data to be generated for the current set of output data and region of output data generated for the previous set of output data may relate to (precisely) the same area of a desired output.

The sets of output data may take any desired and suitable form. For example, the sets of output data may comprise arrays of data (e.g. sampling) positions. The sets of output data may correspond to all or part of a desired output, such as a sequence of frames or textures. There may be any desired and suitable correspondence between the data (e.g. sampling) positions of the sets of output data and the data positions (e.g. pixels or texels) of the desired output. Thus, the data (e.g. sampling) positions of the sets of output data may each correspond to a pixel or pixels of a frame or to a texel or texels of a texture.

The sets of output data can be any desired and suitable size or shape in terms of data (e.g. sampling) positions, for example rectangular (including square). The sets of output data may be, e.g. 1024×768 data (e.g. sampling) positions in size. The sets of output data can also be any desired and suitable size or shape in terms of regions. The sets of output data may be, e.g. 16×12 regions in size.

The region of the sets of output data can also be any desired and suitable size or shape in terms of data (e.g. sampling) positions, for example rectangular (including square). The regions may be, e.g., 4×4, 8×8, 16×16, 32×32, 64×64, etc., data (e.g. sampling) positions in size.

In some embodiments, the regions of output data referred to herein may each be or may each comprise a processing tile, for example that the sets of output data are divided into for generating, processing and/or storage purposes. Thus, the region of output data to be generated for the current set of output data and the region of output data generated for the previous set of output data may each comprise or may each be a processing tile.

In some embodiments, the regions of output data referred to herein may also or instead each be, or may also or instead each comprise, a processing block, for example that the sets of output data are divided into for decoding/decompressing or encoding/compressing purposes. Thus, the region of output data to be generated for the current set of output data and the region of output data generated for the previous set of output data may each comprise, or may each be, a (decoded/decompressed or encoded/compressed) processing block.

As discussed above, the method comprises, and the processing circuitry is configured to perform, a step of predicting whether a region of output data to be generated for a current set of output data will be similar to a region of output data generated for the previous set of output data. This step of predicting whether the region of output data to be generated for the current set of output data will be similar to the corresponding region of output data generated for the previous set of output data may be performed, and the processing circuitry may be configured to perform this step of predicting whether the region of output data to be generated for the current set of output data will be similar to the corresponding region of output data generated for the previous set of output data, in any desired and suitable way.

The apparatus may comprise comparator circuitry that is configured to predict whether the region of output data to be generated for the current set of output data will be similar to the region of output data generated for the previous set of output data.

In some embodiments, a representative subset of data (i.e. some but not all of the data) for the region of output data to be generated for the current set of output data may be generated and used to predict whether the region of output data to be generated for the current set of output data will be similar to the region of output data generated for the previous set of output data.

It has been found that these embodiments can provide a sufficiently accurate prediction as to whether the region of output data to be generated for the current set of output data will be similar to the region of output data generated for the previous set of output data, whilst also potentially avoiding the need to generate all of the data for the region of output data to be generated for the current set of output data.

Thus, in some embodiments, predicting whether the region of output data to be generated for the current set of output data will be similar to the region of output data generated for the previous set of output data may comprise generating a representative subset of data (i.e. some but not all of the data) for the region of output data to be generated for the current set of output data and determining whether the representative subset of data is similar to a representative subset of data for the region of output data generated for the previous set of output data.

In these embodiments, when it is determined that the representative subset of data for the region of data to be generated for the current set of output data is (sufficiently) similar to the representative subset of data for the region of data generated for the previous set of output data, then it may be predicted that the region of output data to be generated for the current set of output data will be similar to the region of output data generated for the previous set of output data.

Conversely, when it is determined that the representative subset of data for the region of data to be generated for the current set of output data is not (sufficiently) similar to the representative subset of data for the region of data generated for the previous set of output data, then it may be predicted that the region of output data to be generated for the current set of output data will not be similar to the region of output data generated for the previous set of output data.

The representative subset of data for the region of output data to be generated for the current set of output data may comprise data for a representative subset of data (e.g. sampling) positions (i.e. some but not all of the data (e.g. sampling) positions) for the region of output data to be generated for the current set of output data.

In some embodiments, the representative subset of data (e.g. sampling) positions may be a lower resolution set of data (e.g. sampling) positions than the complete set of data (e.g. sampling) positions for the region to be generated for the current set of output data. For example, the representative subset of data (e.g. sampling) positions may comprise a lower number of data (e.g. sampling) positions and/or more widely spaced data (e.g. sampling) positions) than the complete set of data (e.g. sampling) positions for the region to be generated for the current set of output data.

The number of data (e.g. sampling) positions for the representative subset of data can be any desired and suitable fraction of the number of data (e.g. sampling) positions for the complete set of data for the region of output data. The fraction may be, for example, ½, ¼, ⅛, 1/16, 1/32, 1/64, etc.

In some embodiments, the representative subset of data (e.g. sampling) positions may also or instead be the data positions for one or more representative subregions (i.e. forming some but not all) of the region to be generated for the current set of output data.

A region of output data to be generated for the current set of output data can be any desired and suitable size or shape in terms of subregions. A region of output data to be generated for the current set of output data may be, e.g. 4×4 subregions in size. A subregion can also be any desired and suitable size or shape in terms of data (e.g. sampling) positions, for example rectangular (including square). A subregion may be, e.g., 1×1, 2×2, 4×4, 8×8 or 16×16 data (e.g. sampling) positions in size.

The sampling pattern for the representative subset of data (e.g. in terms of number and/or position of data (e.g. sampling) positions) can be selected as desired, for example selected such that the representative subset of data is suitably predictive of the output data of the region to be generated.

In some embodiments, the representative subset of data (e.g. sampling) positions and/or one or more representative subregions are substantially evenly distributed across the region of output data to be generated. In some embodiments, the representative subset of data (e.g. sampling) positions and/or one or more representative subregions form a substantially checkerboard pattern within the region of output data to be generated for the current set of output data.

As will be discussed in more detail below, the sampling pattern for the representative subset of data (e.g. the fraction of representative data (e.g. sampling) positions used) may be selected based on a previously determined likelihood that the region of output data to be generated for the current set of output data will be similar to the region of output data generated for the previous set of output data.

The sampling pattern for the representative subset of data for the region of output data generated for the previous set of output data may be the same as the sampling pattern for the representative subset of data for the region of output data to be generated for the current set of output data.

Again, what constitutes "similar" in these embodiments may be selected as desired. For example, in some embodiments the representative subsets of data in question may be considered as being similar when they are substantially the same, e.g. when the representative subsets of data in question have acceptable or visually imperceptible differences. In other embodiments, the representative subsets of data in question may be considered as being similar only when they are identical.

In other embodiments, one or more other (e.g. adjacent) regions of output data may be generated for the current set of output data and used to predict whether the region of output data to be generated for the current set of output data will be similar to the region of output data generated for the previous set of output data.

Thus, in some embodiments, predicting whether the region of output data to be generated for the current set of output data will be similar to the region of output data generated for the previous set of output data may comprise determining whether one or more other (e.g. adjacent) regions of output data generated for the current set of output data are similar to one or more other (e.g. adjacent) regions of output data generated for the previous set of output data. The step of predicting may further comprise generating the one or more other (e.g. adjacent) regions of output data for the current set of output data.

Again, the one or more other (e.g. adjacent) regions of output data generated for the current set of output data and the one or more other (e.g. adjacent) regions of output data generated for the previous set of output data may correspond in terms of position in the desired output, i.e. the one or more other (e.g. adjacent) regions of output data generated for the current set of output data and one or more other (e.g. adjacent) regions of output data generated for the previous set of output data may relate to (precisely) the same one or more areas of the desired output.

In these embodiments, when it is determined that the one or more other (e.g. adjacent) regions of output data generated for the current set of output data are (sufficiently) similar to the one or more other (e.g. adjacent) regions generated for the previous set of output data, then it may be predicted that the region of output data to be generated for the current set of output data will be similar to the region of output data generated for the previous set of output data.

Conversely, when it is determined that the one or more other (e.g. adjacent) regions of output data generated for the current set of output data are not (sufficiently) similar to the one or more other (e.g. adjacent) regions of output data generated for the previous set of output data, then it may be predicted that the region of output data to be generated for the current set of output data will not be similar to the region of output data generated for the previous set of output data.

The arrangement (e.g. in terms of number, size, shape and/or position) of the one or more other (e.g. adjacent) regions of output data generated for the current set of output data can be selected as desired, for example selected such that the output data for the one or more other (e.g. adjacent) regions is suitably predictive of the output data for the region of output data to be generated for the current set of output data. In some embodiments, the one or more other (e.g. adjacent) regions of output data generated for the current set of output data are substantially evenly distributed around the region of output data to be generated for the current set of output data.

Again, what constitutes "similar" in these embodiments may be selected as desired. For example, in some embodiments the other (e.g. adjacent) regions of output data in question may be considered as being similar when they are substantially the same, e.g. when the other (e.g. adjacent) regions of output data in question have acceptable or visually imperceptible differences. In other embodiments, the other (e.g. adjacent) regions of output data in question may be considered as being similar only when they are identical.

In other embodiments, an update pattern for plural previous sets of output data may be used to predict whether the region of output data to be generated for the current set of output data will be similar to the region of output data generated for the previous set of output data.

Thus, in some embodiments, predicting whether the region of output data to be generated for the current set of output data will be similar to the region of output data generated for the previous set of output data may comprise detecting an update pattern that indicates that the region of output data to be generated for the current set of output data will be similar to the region of output data generated for the previous set of output data.

Detecting the update pattern may comprise considering the similarity between regions of output data generated for plural previous (e.g. sequential) sets of output data. For example, the similarity between plural regions of output data generated for plural previous sets of output data may indicate a predictable (e.g. definite or regular) update pattern and/or a particular update rate (e.g. frame rate) for the regions of output data (e.g. for regions comprising imported data (e.g. video data) that is being incorporated into the sets of output data) that is lower than the update rate at which sets of output data are being generated by the apparatus.

Again, the regions of output data generated for the plural previous sets of output data may correspond in terms of position in the desired output, i.e. the regions of output data generated for the plural previous sets of output data may relate to (precisely) the same area of the desired output. Similarly, the region to be generated for the current set of output data and the regions of output data generated for the plural previous sets of output data may correspond in terms of position in the desired output, i.e. the region to be generated for the current set of output data and the regions of output data generated for the plural previous sets of output data may relate to (precisely) the same area of the desired output.

In these embodiments, when an update pattern is detected that indicates that the region of output data to be generated for the current set of output data will be similar to the region of output data generated for the previous set of output data, then it may be predicted that the region of output data to be generated for the current set of output data will be similar to the region of output data generated for the previous set of output data.

For example, where the update pattern that is detected is a predictable (e.g. definite or regular) update pattern and/or has a particular update rate that is lower than the update rate at which sets of output data are being generated by the apparatus, and the region of output data to be generated for the current set of output data is not due to be updated for the current set of output data (e.g. according to the detected update pattern), then it may be predicted that the region of output data to be generated for the current set of output data will be similar to the region of output data generated for the previous set of output data.

Conversely, when an update pattern is detected that indicates that the region of output data to be generated for the current set of output data will not be similar to the region of output data generated for the previous set of output data, then it may be predicted that the region of output data to be generated for the current set of output data will not be similar to the region of output data generated for the previous set of output data.

For example, where the update pattern that is detected is an unpredictable (e.g. random or irregular) update pattern and/or has a particular update rate that is not lower than the update rate at which sets of output data are being generated by the apparatus (e.g. according to the detected update pattern), then it may be predicted that the region of output data to be generated for the current set of output data will not be similar to the region of output data generated for the previous set of output data.

Similarly, where the update pattern that is detected is a predictable (e.g. definite or regular) update pattern and/or a particular update rate that is lower than the update rate at which sets of output data are being generated by the apparatus, but where the region of output data to be generated for the current set of output data is due to be updated for the current set of output data (e.g. according to the detected update pattern), then it may be predicted that the region of output data to be generated for the current set of output data will not be similar to the region of output data generated for the previous set of output data.

The update pattern may be detected by the processing circuitry of the apparatus itself, for example rather than being indicated to the processing circuitry, e.g. by a host processor (e.g. driver). This can avoid the need, for example, for a host processor to be aware of and be programmed to inform the processing circuitry of the update rate for imported data (e.g. video data).

In other embodiments, regions of output data that have been generated for plural previous (e.g. sequential) sets of output data may be used to predict whether the region of output data to be generated for the current set of output data will be similar to the region of output data generated for the previous set of output data.

Thus, in some embodiments, predicting whether the region of output data to be generated for the current set of output data will be similar to the region of output data generated for the previous set of output data may comprise determining whether regions of output data that have been generated for plural previous sets of output data are similar to one another.

Again, the regions of output data generated for the plural previous sets of output data may correspond in terms of position in the desired output, i.e. the regions of output data generated for the plural previous sets of output data may relate to (precisely) the same area of the desired output. Similarly, the region to be generated for the current set of output data and the regions of output data generated for the plural previous sets of output data may correspond in terms of position in the desired output, i.e. the region to be generated for the current set of output data and the regions of output data generated for the plural previous sets of output data may relate to (precisely) the same area of the desired output.

In these embodiments, when it is determined that the regions of output data previously generated for the plural previous sets of output data have been (sufficiently) similar to one another for a threshold number N of previous sets of output data, then it may be predicted that the region of output data to be generated for the current set of output data will be similar to the region of output data generated for the previous set of output data.

Conversely, when it is determined that the regions of output data previously generated for the plural previous sets of output data have not been (sufficiently) similar to one another for a threshold number N of previous sets of output data, then it may be predicted that the region of output data to be generated for the current set of output data will not be similar to the region of output data generated for the previous set of output data.

The plural previous sets of output data may or may not be consecutive previous sets of output data. N may be any desired and suitable number. In some embodiments, N is in the range 2-200. In some embodiments, N is in the range 2-100. In some embodiments, N is in the range 2-50. In some embodiments, N is in the range 2-20.

Again, what constitutes "similar" in these embodiments may be selected as desired. For example, in some embodiments the regions in question may be considered as being similar when they are substantially the same, e.g. when the regions in question have acceptable or visually imperceptible differences. In other embodiments, the regions in question may be considered as being similar only when they are identical.

In some embodiments, plural of the above steps of predicting may be used to predict whether the region of output data to be generated for the current set of output data will be similar to the region of output data generated for the previous set of output data.

For example, predicting whether the region of output data to be generated for the current set of output data will be similar to the region of output data generated for the previous set of output data may comprise using regions that have been generated for plural previous sets of output data to initially predict and/or provide a likelihood as to whether the region to be generated for the current set of output data will be similar to the region generated for the previous set of output data and, when it is initially predicted and/or considered likely that the region of output data to be generated for the current set of output data will be similar to a region of output data generated for the previous set of output data, generating and using a representative subset of data for the region to be generated for the current set of output data to provide a further (e.g. final) prediction as to whether the region to be generated for the current set of output data will be similar to the region generated for the previous set of output data.

These embodiments can allow, for example, for a less refined but less resource-intensive (e.g. background) process to be used initially, and then a more resource-intensive but more refined process to be used to provided a further (e.g. final) prediction on which subsequent steps may be based.

Similarly, as discussed above, a likelihood that the region to be generated for the current set of output data will be similar to the region generated for the previous set of output data may be determined and used as a basis for selecting the sampling pattern (e.g. number of data (e.g. sampling) positions) for the representative subset of data for the region to be generated to use for predication purposes.

The likelihood may be determined based on the number of previous sets of output data for which regions have been similar to one another.

For example, when the number of previous sets of output data for which regions have been similar to one another is relatively lower, then the likelihood that the region to be generated for the current set of output data will be similar to the region generated for the previous set of output data may be determined as being relatively lower. In this case, a relatively larger amount or fraction of representative subset of data for the region of output data to be generated for the current set of output data may be generated and used when predicting whether the region to be generated for the current set of output data will be similar to the region generated for the previous set of output data, i.e. a more resource-intensive but more comprehensive prediction may be performed.

Conversely, when the number of previous sets of output data for which regions have been similar to one another is relatively higher, then the likelihood that the region to be generated for the current set of output data will be similar to the region generated for the previous set of output data may be determined as being relatively higher. In this case, a relatively smaller amount or fraction of representative subset of data (including no data) for the region of output data to be generated for the current set of output data may be generated and used when predicting whether the region to be generated for the current set of output data will be similar to the region generated for the previous set of output data, i.e. a less comprehensive but less resource-intensive prediction may be performed.

The relationship between the determined likelihood (e.g. number of previous sets of output data for which the regions have been similar to one another) and the sampling pattern for the subset of data (e.g. number or fraction of data (e.g. sampling) positions) to use when predicting whether the region to be generated for the current set of output data will be similar to the region generated for the previous set of output data may take any desired and suitable form.

In some embodiments, the relationship may be defined by a set of thresholds for the number of previous sets of output data for which the regions have been similar to one another and a corresponding sampling pattern for the subset of data (e.g. number or fraction of data (e.g. sampling) positions) to use when predicting whether the region to be generated for the current set of output data will be similar to the region generated for the previous set of output data.

For example, when the regions have been similar for at least the previous 10 sets of output data, then a sampling pattern forming ¼ of the data for the region to be generated for the current set of output data may be used when predicting whether the region to be generated for the current set of output data will be similar to the region generated for the previous set of output data. Then, when the regions have been similar for at least the previous 50 sets of output data, then a sampling pattern forming 1/16 of the data for the region to be generated for the current set of output data may be used when predicting whether the region to be generated for the current set of output data will be similar to the region generated for the previous set of output data.

These embodiments can allow, for example, a more resource-intensive but more comprehensive prediction to be performed when the region of output data to be generated for the current set of output data is determined as being less likely to be similar to the region of output data generated for the previous set of output data (so as to try to avoid confirming a prediction that is more likely to be false), and a less comprehensive but less resource-intensive prediction to be performed when the region of output data to be generated for the current set of output data is determined as being more likely to be similar to the region of output data generated for the previous set of output data (so as to try to avoid wasting processing resources confirming a prediction that is more likely to be true).

The step of predicting whether the region of output data to be generated for the current set of output data will be similar to the region of output data generated for the previous set of output data may be initiated and/or controlled, and the processing circuitry may be configured to initiate and/or control the step of predicting whether the region of output data to be generated for the current set of output data will be similar to the region of output data generated for the previous set of output data, in any desired and suitable way.

In some embodiments, a set of update data (e.g. an update bitmap or array) may be provided for the current set of output data that can be used to determine whether the region of output data to be generated for the current set of output data must be generated for the current set of output data (and thus whether a (e.g. further) step of predicting whether the region of output data to be generated for the current set of output data will be similar to the region of output data generated for the previous set of output data is not to be performed).

The set of update data (e.g. an update bitmap) may also or instead be used to determine whether the region of output data to be generated for the current set of output data does not need to be generated for the current set of output data (and thus whether a (e.g. further) step of predicting whether the region of output data to be generated for the current set of output data will be similar to the region of output data generated for the previous set of output data is to be performed).

The set of update data (e.g. an update bitmap) may also or instead be used to determine whether the region of output data to be generated for the current set of output data must not be generated for the current set of output data (and thus whether a (e.g. further) step of predicting whether the region of output data to be generated for the current set of output data will be similar to the region of output data generated for the previous set of output data is not to be performed).

The set of update data may also or instead be used to determine the manner in which a step of prediction should be performed.

The set of update data may comprise an entry (e.g. a bit and/or (e.g. counter) value) for each region to be generated for the current set of output data.

The entry for a particular region may indicate (e.g. with a 0 or 1) whether that particular region must be generated for the current set of output data (and thus whether a (e.g. further) step of predicting whether the region of output data to be generated for the current set of output data will be similar to the region of output data generated for the previous set of output data is not to be performed).

The entry for a particular region may also or instead indicate (e.g. with a 0 or 1) whether that particular region does not need to be generated for the current set of output data (and thus whether a (e.g. further) step of predicting whether the region of output data to be generated for the current set of output data will be similar to the region of output data generated for the previous set of output data is to be performed).

The entry for a particular region may also or instead indicate (e.g. with a 0 or 1) whether that particular region must not be generated for the current set of output data (and thus whether a (e.g. further) step of predicting whether the region of output data to be generated for the current set of output data will be similar to the region of output data generated for the previous set of output data is not to be performed).

The entry for a particular region may also or instead be used to determine the manner in which the prediction should be performed for the particular region to be generated for the current set of output data. For example, the entry may be a (e.g. counter) value that indicates the number of previous sets of output data for which regions have been similar to one another.

Thus, embodiments may comprise using a set of update data that is provided for the current set of output data to determine whether a region of output data to be generated for the current set of output data must be generated for the current set of output data and, when the set of update data indicates that that region must be generated, generating that region of output data. In this case, a (e.g. further) step of predicting may not be performed in respect of that region.

Similarly, embodiments may comprise using a set of update data that is provided for the current set of output data to determine whether a region of output data to be generated for the current set of output data must be generated for the current set of output data and, when the set of update data indicates that that region does not need to be generated for the current set of output data, then a (e.g. further) step of predicting may be performed in respect of that region. In this case, as will be discussed below, the region to be generated for the current set of output data may or may not be generated as a result of the (e.g. further) step of predicting.

Similarly, embodiments may comprise using a set of update data that is provided for the current set of output data to determine whether a region of output data to be generated for the current set of output data must not be generated for the current set of output data and, when the set of update data indicates that that region must not be generated, not generating that region of output data for the current set of output data and using the region generated for the previous set of output data instead. In this case, a (e.g. further) step of predicting may not be performed in respect of that region.

In some embodiments, an entry (e.g. bit and/or counter) in a set of update data may be set, incremented or reset depending on the outcome of the prediction for the region to be generated for the current set of output data.

Thus, in some embodiments, when it is predicted that a particular region of output data to be generated for the current set of output data will be similar to a particular region of output data generated for the previous set of output data, an entry (e.g. bit and/or counter) for the particular region in a set of update data provided for the set of output data may be incremented or set to indicate that a region to be generated for subsequent set of output data must not or does not need to be generated for the subsequent set of output data.

Conversely, in some embodiments, when it is predicted that a particular region of output data to be generated for the current set of output data will not be similar to a particular region of output data generated for the previous set of output data, an entry (e.g. bit and/or counter) for the particular region in a set of update data provided for the set of output data may be reset or set to indicate that a region to be generated for a subsequent set of output data must be generated for the subsequent set of output data.

As discussed above, the method comprises, and the processing circuitry is configured to perform, a step of, when it is predicted that a particular region of output data to be generated for the current set of output data will be similar to a particular region of output data generated for the previous set of output data, preventing the particular region of output data from being generated for the current set of output data. (Although, in some embodiments, as discussed above, a representative subset of data for the region to be generated for the current set of output data may nevertheless still have been generated (e.g. for prediction purposes) for the current set of output data).

This step of preventing the particular region of output data to be generated for the current set of output data from being generated for the current set of output data may be controlled, and the processing circuitry may be configured to control this step of preventing the particular region of output data to be generated for the current set of output data from being generated for the current set of output data, in any desired and suitable way.

In some embodiments, the processing circuitry may be prevented from generating the particular region of output data by control circuitry of the apparatus.

As discussed above, embodiments of the technology described herein also comprise, and the processing circuitry may be configured to perform, a step of, when it is predicted that a particular region of output data to be generated for the current set of output data will be similar to a particular region of output data generated for the previous set of output data, using the particular region of output data generated for the previous set of output data as the particular region for the current set of output data.

This step of using the particular region of output data generated for the previous set of output data as the particular region for the current set of output data may be performed, and the processing circuitry may be configured to perform this step of using the particular region of output data for the current set of output data, in any desired and suitable way.

For example, using the particular region of output data generated for the previous set of output data as the particular region for the current set of output data may comprise reading the particular region of output data generated for the previous set of output data from the memory. The particular region of output data generated for the previous set of output data may be read from the memory by memory controller circuitry and/or by output (e.g. display) controller circuitry.

Using the particular region of output data generated for the previous set of output data as the particular region for the current set of output data may also or instead comprise outputting the particular region of output data generated for the previous set of output data, for example for display. The particular region of output data generated for the previous set of output data may be output by output (e.g. display) controller circuitry, for example to a display.

In some cases, it may be predicted that a particular region of output data to be generated for the current set of output data will be similar to a particular region of output data generated for the previous set of output data. However, in other cases, it may be predicted that a particular region of output data to be generated for the current set of output data will not be similar to a particular region of output data generated for the previous set of output.

In these other cases, when it is predicted that a particular region of output data to be generated for the current set of output data will not be similar to a particular region of output data generated for the previous set of output data, the particular region of output data to be generated for the current set of output data may still not be generated for the current set of output data and/or the particular region of output data generated for the previous set of output data may still be used as the particular region for the current set of output data. This can avoid the need, for example, to generate the particular region of output data for the current set of output data, e.g. in situations where it not necessary to do so and/or were there is limited time and/or processing resources available to do so.

In these embodiments, the corresponding region of output data to be generated for the subsequent set of output data may be generated for the subsequent set of output data. As discussed above, this may be controlled by resetting or setting an appropriate entry (e.g. bit or value) in a set of update data for the subsequent set of output data to indicate that the corresponding region of output data to be generated for the subsequent set of output data must be generated for the subsequent set of output data.

These embodiments can mean that the particular region of output data to be generated for the current set of output data, despite potentially being different to the region of output data generated for the previous set of output data, may not be updated for the current set of output data. This may be imperceptible and/or acceptable in many situations, for example since the area in question may be updated in the subsequent set of output data. However, in other situations this may be perceptible and/or undesirable.

Thus, in other embodiments, when it is predicted that a particular region of output data to be generated for the current set of output data will not be similar to a particular region of output data generated for the previous set of output data, the particular region of output data may be generated and used for the current set of output data. These embodiments can allow an updated particular region of output data to be provided for the current set of output data.

The step of generating the particular region of output data for the current set of output data may be performed, and the processing circuitry may be configured to perform the step of generating the particular region of output data for the current set of output data, in any desired and suitable way.

In some embodiments, the processing circuitry of the apparatus may be controlled so as to generate the particular region of output data by control circuitry of the apparatus.

In some embodiments, the particular region of output data may be generated anew for the current set of output data. However, as discussed above, there may be limited time and/or processing resources available to do this.

Thus, in embodiments in which a representative subset of data for the particular region to be generated for the current set of output data is generated (e.g. for prediction purposes as discussed above), generating the particular region of output data for the current set of output data may comprise up-scaling the representative subset of data for the particular region so as to generate the output data for the particular region of output data.

These embodiments can allow an updated particular region of output data to be generated for the current set of output data, for example more quickly and/or using fewer processing resources than generating the particular region of output data for the current set of output data anew.

These embodiments may comprise up-scaling the representative subset of data for the particular region of output data substantially immediately after generating the representative subset of data for the particular region of output data, so as to try to make use of any (e.g. cached and/or buffered) data that may have been generated and/or used when generating the representative subset of data for the particular region of output data.

Alternatively, in embodiments in which a representative subset of data for the particular region to be generated for the current set of output data is generated (e.g. for prediction purposes as discussed above), generating the particular region of output data for the current set of output data may comprise generating the remaining subset of data for the particular region of output data so as to generate the output data for the particular region of output data.

Again, these embodiments can allow an updated (full precision) particular region of output data to be generated for the current set of output data, for example more quickly and/or using fewer processing resources than generating the particular region of output data for the current set of output data anew.

These embodiments may comprise generating the remaining subset of data for the particular region of output data substantially immediately after generating the representative subset of data for the particular region of output data, so as to try to make use of any (e.g. cached and/or buffered) data that may have been generated and/or used when generating the representative subset of data for the particular region of output data.

The representative subset of data for the particular region of output data and the remaining subset of data for the particular region of output data may be generated by the same part of the apparatus (e.g. the same shader core). Alternatively, the representative subset of data for the particular region of output data and the remaining subset of data for the particular region of output data may be generated by the different parts of the apparatus (e.g. different shader cores). These alternative embodiments may, for example, be less complex to implement.

As discussed above, embodiments which make use of a representative subset of data for prediction purposes can provide sufficiently accurate predictions as to whether a region of output data to be generated for a current set of output data will be similar to a region of output data generated for the previous set of output data, whilst potentially avoiding the need to generate the region of output data to be generated for the current set of output data in full.

Furthermore, these embodiments may be particularly efficient when a full version of a particular region of output data to be generated for the current set of output data does then need to be generated for the current set of output data since a representative subset of data for the particular region has already been generated for prediction purposes.

The step of using the particular region of output data for the current set of output data may then be performed, and the processing circuitry may be configured to perform a step of using the particular region of output data for the current set of output data, in any desired and suitable way.

For example, using the particular region of output data for the current set of output data may comprise writing the particular region of output data to the memory. The particular region of output data may be written to memory by the write controller circuitry.

Using the particular region of output data for the current set of output data may also or instead comprise reading the particular region of output data from the memory. The particular region of output data may be read from the memory by memory controller circuitry and/or by output (e.g. display) controller circuitry.

Using the particular region of output data for the current set of output data may also or instead comprise outputting the particular region of output data, for example for display. The particular region of output data may be output by output (e.g. display) controller circuitry, for example to a display.

Predicting whether the region of output data to be generated for the current set of output data will be similar to the region of output data generated for the previous set of output data may result in a correct prediction. However, predicting whether the region of output data to be generated for the current set of output data will be similar to the region of output data generated for the previous set of output data may not, and indeed need not, always result in a correct prediction.

Thus, where it is predicted that a particular region of output data to be generated for the current set of output data will not be similar to a particular region of output data generated for the previous set of output data, and the particular region of output data is accordingly generated for the current set of output data, the particular region of output data may, in fact, be similar to the particular region of output data generated for the previous set of output data.

Also, where it is predicted that a particular region of output data to be generated for the current set of output data will not be similar to a particular region of output data generated for the previous set of output data, and the particular region of output data is accordingly generated for the current set of output data, the particular region of output data may also or instead be similar to another region of output data generated for the current set of output data.

In these situations, it may be a less efficient use of memory bandwidth to write the particular region of output data generated for the current set of output data to the memory, for example because a similar region of output data generated for the previous set of output data and/or a similar region of output data generated for the current set of output data may be stored in memory and can be used instead of the particular region of output data.

Thus, in embodiments in which it is predicted that a particular region of output data to be generated for the current set of output data will not be similar to a particular region of output data generated for the previous set of output data, and in which the particular region of output data is generated for the current set of output data, it may then further be determined whether the particular region of output data generated for the current set of output data is in fact similar to the particular region of output data generated for the previous set of output data.

In these embodiments, when it is determined that the particular region of output data generated for the current set of output data is similar to the particular region of output data generated for the previous set of output data, the particular region of output data generated for the current set of output data may not be written to the memory. Instead, the particular region of output data generated for the previous set of output data may still be used as the particular region for the current set of output data.

Thus, in some embodiments, the write controller circuitry may be configured to be able to prevent a region of output data generated for the current set of output data being written to memory.

Conversely, when it is determined (i.e. confirmed) that the particular region of output data generated for the current set of output data is not similar to the particular region of output data generated for the previous set of output data, the particular region of output data generated for the current set of output data may be written to the memory and used for the current set of output data.

Similarly, in embodiments in which it is predicted that a particular region of output data to be generated for the current set of output data will not be similar to a particular region of output data generated for the previous set of output data, and in which the particular region of output data is generated for the current set of output data, it may then further be determined whether the particular region of output data generated for the current set of output data is similar to another region of output data generated for the current set of output data.

In these embodiments, when it is determined that the particular region of output data generated for the current set of output data is similar to another region of output data generated for the current set of output data, the particular region of output data generated for the current set of output data may not be written to the memory. Instead, the other region of output data generated for the current set of output data may be written to the memory and/or may be used as the particular region for the current set of output data.

Thus, as discussed above, in some embodiments, the write controller circuitry may be configured to be able to prevent a region of output data generated for the current set of output data being written to memory.

Conversely, when it is not determined that the particular region of output data generated for the current set of output data is similar to another region of output data generated for the current set of output data, the particular region of output data generated for the current set of output data may be written to the memory and used for the current set of output data.

In any of the above embodiments, a signature that is representative of the contents of a region of the output data (i.e. a "content-representative signature") may be used when predicting or determining whether a region of output data will be or is similar to another region of output data.

A content-representative signature may take any desired and suitable form that is representative of the contents of the region (i.e. of the data (e.g. colour) values of the data (e.g. sampling) positions of the region). The content-representative signature may comprise, for example, a data (e.g. colour) value, a checksum, a CRC, or a hash value, etc., derived from or generated for the data for the region in question. Suitable content-representative signatures can include standard CRCs, such as CRC32, or other forms of content-representative signature such as MD5, SHA-1, etc.

A content-representative signature may be generated in any desired and suitable way. The apparatus may comprise signature generating circuitry that receives data for a region and generates a content-representative signature based on the data for the region.

A content-representative signature may be generated for a region based on data for all or substantially all of the data (i.e. for all of the data (e.g. sampling) positions of the region of output data. This type of content-representative signature may be referred to herein as a "full signature".

A content-representative signature may also or instead be generated for a subset of data (i.e. for some but not all of the data (e.g. sampling) positions) of the region, e.g. a representative subset of data that is used for predication purposes and/or a remaining subset of data. This type of content-representative signature may be referred to herein as a "sub-signature".

In embodiments in which plural different sampling patterns (e.g. in terms of number and/or position of data (e.g. sampling) position) may be used by the apparatus, a sub-signature may correspond to a particular sampling pattern. Furthermore, a sub-signature may be generated for each particular sampling pattern that may be used by the apparatus.

A full signature may be derived directly from the data for the region. Alternatively, a full signature may comprise, or may be derived from, a first sub-signature (e.g. derived for a representative subset of data) for the region and a second sub-signature (e.g. derived for a remaining subset of data) for the region.

In some embodiments, one or more content-representative signatures (e.g. full signature, a first sub-signature, a second sub-signature, etc.) may be or may have been generated for each one of plural regions of a set of output data (e.g. the previous set of output data, the current set of output data, etc.) so as to provide a list or array of content-representative signatures for the set of output data.

In some embodiments, the one or more content-representative signatures may be generated while processing (e.g. generating data for) the regions of the set of output data. In these embodiments, processing (e.g. generating data for) the regions may be interleaved with generating the one or more content-representative signatures for the regions. For example, a first region may be processed (e.g. data may be generated for the first region) and one or more content-representative signatures for the first region may be generated, then a second region may be processed (e.g. data may be generated for the second region) and one or more content-representative signatures for the second region may be generated, and so on.

The content-representative signatures for a set of output data (e.g. the previous set of output data, the current set of output data, etc.) may be stored in memory, for example to allow those content-representative signatures to be used when processing a subsequent set of output data (e.g. the current set of output data, the subsequent set of output data, etc.).

The content-representative signatures may be used in any desired and suitable way. The apparatus may comprise signature comparator circuitry that predicts or determines whether a region of output data will be or is similar to another region of output data.

In some embodiments, a content-representative signature derived for the region of output data to be generated for the current set of output data may be used when predicting whether the region of output data to be generated for the current set of output data will be similar to the region of output data generated for the previous set of output data. This use of content-representative signatures can avoid the need, for example, to consider the regions of output data themselves when making a prediction.

Thus, in embodiments in which the step of predicting whether the region of output data to be generated for the current set of output data will be similar to the region of output data generated for the previous set of output data comprises determining whether a representative subset of data for the region of output data to be generated for the current set of output data is similar to a representative subset of data for the region of output data generated for the previous set of output data, determining whether the representative subset of data for the region of output data to be generated for the current set of output data is similar to the representative subset of data for the region of output data generated for the previous set of output data may comprise determining whether a content-representative (sub) signature derived for the representative subset of data for the region of output data to be generated for the current set of output data is similar to a content-representative (sub) signature derived for the representative subset of data for the region of output data generated for the previous set of output data.

Similarly, in embodiments in which predicting whether the region of output data to be generated for the current set of output data will be similar to the region of output data generated for the previous set of output data comprises determining whether the one or more other (e.g. adjacent) regions generated for the current set of output data are similar to one or more other (e.g. adjacent) regions generated for the previous set of output data, determining whether the one or more other (e.g. adjacent) regions generated for the current set of output data are similar to the one or more other (e.g. adjacent) regions generated for the previous set of output data may comprise determining whether one or more content-representative (full or sub) signatures derived for the one or more other (e.g. adjacent) regions generated for the current set of output data are similar to one or more content-representative (full or sub) signatures derived for the one or more other (e.g. adjacent) regions generated for the previous set of output data.

Similarly, in embodiments in which predicting whether the region of output data to be generated for the current set of output data will be similar to the region of output data generated for the previous set of output data comprises considering the similarity between regions of output data that have been generated for plural previous sets of output data, considering the similarity between the regions may comprise determining whether content-representative (full or sub) signatures derived for the regions that have been generated for plural previous sets of output data are all similar to one another.

A content-representative signature derived for a region of output data may also or instead be used when determining whether a particular region of output data generated for the current set of output data is similar to a region generated for the previous set of output data and/or another region that has been generated for the current set of output data. Again, this use of content-representative signatures can avoid the need, for example, to consider the regions of output data themselves when making a determination.

Thus, in embodiments in which it is determined whether the particular region of output data generated for the current set of output data is similar to the particular region of output data generated for the pervious set of output data, determining whether the particular region of output data generated for the current set of output data is similar to the particular region of output data generated for the pervious set of output data may comprise determining whether content-representative (full or sub) signature derived for the particular region generated for the current set of output data and a content-representative (full or sub) signature derived for the particular region generated for the pervious set of output data are similar to each other.

Similarly, in embodiments in which it is determined whether the particular region of output data generated for the current set of output data is similar to another region of output data generated for the current set of output data, determining whether the particular region of output data generated for the current set of output data is similar to the another region of output data generated for the current set of output data may comprise determining whether a content-representative (full or sub) signature generated for the region derived for the current set of output data and a content-representative (full or sub) signature derived for the other region generated for the current set of output data are similar to each other.

Again, what constitutes "similar" in any of these embodiments may be selected as desired. For example, in some embodiments two content-representative signatures may be considered as being similar when they are substantially the same and, for example, differ by less than a selected amount. In other embodiments, two content-representative signatures may be considered as being similar only when they are identical.

As discussed above, predicting whether the region of output data to be generated for the current set of output data will be similar to the region of output data generated for the previous set of output data may not, and indeed need not, always result in a correct prediction.

Thus, where it is predicted that a particular region of output data to be generated for the current set of output data will be similar to a particular region of output data generated for the previous set of output data, and the particular region of output data is accordingly not generated for the current set of output data, the particular region of output data may, had it been generated, have been dissimilar to the particular region of output data generated for the previous set of output data. This may lead to the regions of the desired output sometimes not updating when they should have been updated. This may be imperceptible and/or acceptable in some situations.

However, in some embodiments, the regions of the sets of output data may be (either systematically or randomly) generated for their set of output data, i.e. without a step of predicting being performed. For example, in some embodiments, the content-representative signatures and/or the set of update data described above may be (either systematically or randomly) altered or "salted". These embodiments can help to ensure that the regions of the sets of output data are updated from time to time, for example to check that the regions are, in fact, still static and/or to reduce the possibility of artefacts appearing and persisting in the desired output.

The sets of output data referred to herein may be generated in any desired and suitable way.

In embodiments, generating each set of output data comprises a rendering process (e.g. performed by a graphics processor or central processor of the apparatus). The rendering process may comprise deriving the data values for the data (e.g. sampling) positions of the set of output data (e.g. by rasterising primitives to generate graphics fragments and/or by rendering graphics fragments). The rendering process may be performed in software and/or hardware.

The apparatus may use a graphics processing pipeline in order to generate the sets of output data. The graphics processing pipeline may contain any suitable and desired graphics processing pipeline stages that graphics pipeline may contain, such as a vertex shader, a rasterisation stage, a rendering stage, a pixel processor stage, etc., in order to generate the output data.

In some embodiments, generating each set of output data may also or instead comprise image (post) processing (e.g. performed by a graphics processor, central processor, or image processor of the apparatus). The image (post) processing may comprise, e.g., filtering, scaling, applying one or more effects, etc. Again, the image (post) processing may be performed in software and/or hardware.

In some embodiments, generating each set of output data may also or instead comprise a compositing process (e.g. performed by a graphics processor, central processor, compositing processor, or output (e.g. display) processor, of the apparatus). Again, the compositing process may be performed in software and/or hardware.

In some embodiments, generating each set of output data may also or instead comprise a decoding/decompressing or encoding/compressing process (e.g. performed by a graphics processor, central processor, or video (coding) processor, of the apparatus). Again, the decoding/decompressing or encoding/compressing process may be performed in software and/or hardware.

As discussed above, in some embodiments, each region may comprise or may be a processing tile that the sets of output data are divided into for generating, processing and/or storage purposes. In these embodiments, generating a set of output data may comprise separately generating and/or processing the respective regions of the set of output data, e.g. in parallel and/or in series.

Also as discussed above, in some embodiments, each region may also or instead comprise, or may also or instead be, a processing block that the sets of output data are divided into for decoding/decompressing or encoding/compressing purposes. In these embodiments, generating a set of output data may comprise separately decoding/decompressing or encoding/compressing the respective regions of the set of output data, e.g. in parallel and/or in series.

Any of the above described processes that are performed in respect of a region of output data to be generated for the current set of output data may, in practice, be performed respectively for each (every) one of plural regions of the current set of output data that is to be generated.

Similarly, any of the above described processes that are performed in respect of the current set of output data may, in practice, be performed respectively (and sequentially) for of each (every) one of plural (sequential) sets of output data.

In some embodiments, the data processing apparatus may comprise one or more of or may be: a central processor; a graphics processor; an image processor; a video (coding) processor; a compositing processor; and an output (e.g. display) processor.

In some embodiments, the data processing apparatus may comprise or may be a graphics processor that comprises one of more of: the write controller circuitry; the processing circuitry; the comparator circuitry; the signature comparator circuitry; the control circuitry; and the signature generating circuitry, as described herein in any embodiment.

The technology described herein can be used for all forms of output that a data (e.g. graphics) processing apparatus may be used to generate, such as frames for display, render to texture outputs, etc. Thus, the output data may comprise (e.g. post-processed and/or composited and/or encoded/compressed or decoded/decompressed) graphics data and the sets of output data and/or desired output may comprise (e.g. post-processed and/or composited and/or encoded/compressed or decoded/decompressed) frames or textures of graphics data.

In an embodiment, the various functions of the technology described herein are carried out on a single data (e.g. graphics) processing platform that generates and/or uses the sets of output data.

In some embodiments, the data processing apparatus may comprise or may be a system on chip (SoC).

The data processing apparatus of the technology described herein may be part of an overall data (e.g. graphics) processing system that includes, for example, a host processor. The host processor may, for example, execute applications that require data (e.g. graphics) processing by the data processing apparatus. The host processor may send appropriate commands and data to the data processing apparatus to control it to perform data (e.g. graphics) processing operations and to produce an (e.g. graphics) output required by applications executing on the host processor. To facilitate this, the host processor may execute a driver for the data processing apparatus and/or may execute a compiler or compilers for compiling (e.g. shader) programs to be executed by a programmable execution unit of the data processing apparatus.

In embodiments, the apparatus or system (e.g. SoC or overall system) comprises the memory controller circuitry and/or by output (e.g. display) controller circuitry (e.g. of a display processor), as described herein in any embodiment.

In some embodiments, the apparatus or system comprises, and/or is in communication with, one or more memories and/or memory devices that store the data described herein, and/or store software for performing the processes described herein. The apparatus or system may be in communication with a host microprocessor, and/or with a display for displaying images based on the sets of output data.

The technology described herein can be implemented in any suitable system, such as a suitably configured computer or micro-processor based system. In an embodiment, the technology described herein is implemented in a computer and/or micro-processor based system.

The various functions of the technology described herein can be carried out in any desired and suitable manner. For example, the steps and functions of the technology described herein can be implemented in hardware or software, as desired. Thus, for example, unless otherwise indicated, the various circuitry, functional elements, stages, and "means" of the technology described herein may comprise a suitable processor or processors, controller or controllers, functional units, circuitry, processing logic, microprocessor arrangements, etc., that are operable to perform the various steps or functions, etc., such as appropriately dedicated hardware elements (processing circuitry) and/or programmable hardware elements (processing circuitry) that can be programmed to operate in the desired manner.

It should also be noted here that the various steps or functions, etc., of the technology described herein may be duplicated and/or carried out in parallel on a given processor. Equally, the various processing stages may share processing circuitry, etc., if desired.

Subject to any hardware necessary to carry out the specific steps or functions, etc., discussed above, the apparatus or system can otherwise include any one or more or all of the usual functional units, etc., that data (e.g. graphics) processing apparatus or systems include.

The various data (e.g. graphics) processing stages can accordingly be implemented as desired and in any suitable manner, and can perform any desired and suitable functions, respectively. Similarly, the various data (output data, content-representative signatures, update data, etc.) can be defined and stored in any suitable and desired manner.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. Thus, further embodiments comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processor. The data processor may be a microprocessor system, a programmable FPGA (field programmable gate array), etc.

The technology described herein also extends to a computer software carrier comprising such software which when used to operate a data processing apparatus, graphics processor, renderer or microprocessor system comprising a data processor causes in conjunction with said data processor said apparatus, processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non transitory medium, such as a computer readable medium, for example, diskette, CD, DVD, ROM, RAM, flash memory, or hard disk. It could also comprise a series of computer readable instructions transmittable to a computer system, via a modem or other interface device, either over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

As discussed above, embodiments of the technology described herein relate to predicting whether a region of output data (e.g. a tile of graphics data) that has not yet been generated for a current set of output data (e.g. a current frame of graphics data) will be similar to a region of output data (e.g. a tile of graphics data) generated for a previous set of output data (e.g. a previous frame of graphics data).

When it is predicted that those regions will be similar, the region to be generated for the current set of output data is prevented from being generated and the region of output data that was generated for the previous set of output data is used instead.

Embodiments can accordingly avoid the need, for example, to generate a region of output data for the current set of output data for an area of an output that is likely to remain unchanged from one set of output data to the next. This in turn can significantly reduce power and bandwidth consumption.

Various embodiments of the technology described herein will be described in the context of the processing of frames of graphics data for display. However, the concepts described herein can equally be applied to other contexts in which sets of other types of output data are to be generated sequentially by data processing apparatus.

FIG. 1 shows a data processing system 100 according to an embodiment of the technology described herein. In this embodiment, the system 100 comprises a system on chip (SoC) 102, off-chip (main) memory 116 and a display 118.

The SoC 102 comprises a central processing unit (CPU) 104, a graphics processing unit (GPU) 106, a video (coding) engine 108, a display controller 110, an interconnect 112 and a memory controller 114.

As is shown in FIG. 1, the CPU 104, GPU 106, video engine 108, and display controller 110 communicate with each other via the interconnect 112 and with the memory 116 via the interconnect 112 and memory controller 114. The display controller 110 also communicates with the display 118.

The video engine 108 can be used to decode encoded video data to be incorporated into frames of graphics data. The video engine 108 can also be used to encode frames of graphics data generated by the system 100.

In the following embodiments, the GPU 106 generates frames of graphics data. As part of this process, the GPU 106 can incorporate video data that is provided by the video engine 108 into the frames of graphics data. The GPU 106 then stores the resultant, e.g. composited, frames of graphics data in the memory 116. The frames of graphics data are then output, e.g. for display. In other embodiments, the CPU 104 also or instead generates frames of graphics data.

Figure 2:
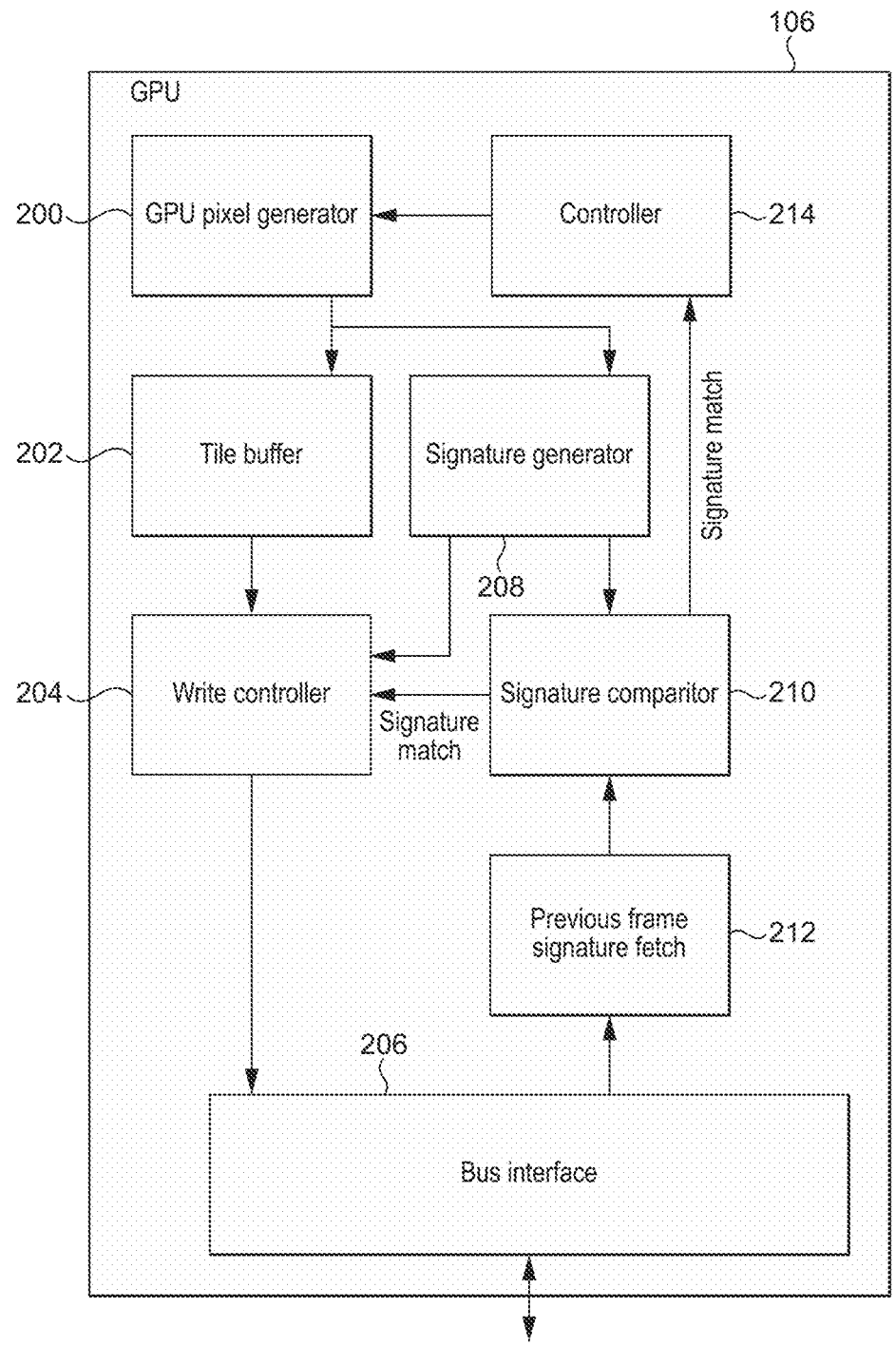
FIG. 2 shows schematically a graphics processor according to an embodiment of the technology described herein.

FIG. 2 shows further details of the GPU 106 of the system 100 of FIG. 1.

In this embodiment, the GPU 106 comprises a GPU pixel generator 200 that generates each frame of graphics data. In this embodiment, the GPU pixel generator 200 generates, in series, regions or "tiles" of each frame of graphics data using a graphics processing pipeline. In this embodiment, each tile comprises 16×16 data sampling positions. Other tile sizes can be used as desired.

The tiles of graphics data are stored in a tile buffer 202 of the GPU 106 prior to being stored in memory 116. The tiles of graphics data are written to memory 116 via a write controller 204 and bus interface 206.

Figure 3:
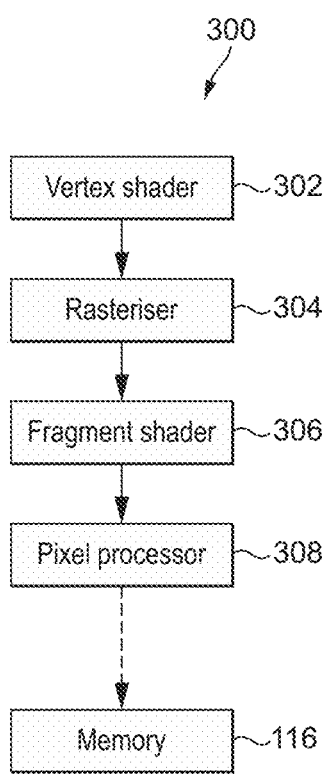
FIG. 3 shows a graphics processing pipeline according to an embodiment of the technology described herein.

The graphics processing pipeline and rendering process will now be described in more detail with reference to FIG. 3, which illustrates the various stages of the graphics processing pipeline 300 together with the memory 116 of the system 100.

The pipeline 300 comprises a sequence of different stages, which each perform a different operation on "primitives" (e.g. polygons) making up the surfaces of the features of the frame to prepare them for output.

First in the pipeline 300 is a vertex shader 302 which vertex shades the vertices of the primitives for the output being generated. The vertex shader 302 takes input data values associated with the vertices, etc., defined for the output to be generated, and processes those data values to generate a set of vertex shaded attribute data values for use by subsequent stages of the graphics processing pipeline 300.

The rasteriser 304 then operates to rasterise the primitives making up the render output into individual graphics fragments for processing. To do this, the rasteriser 304 receives the graphics primitives for rendering, rasterises the primitives to sampling points and generates graphics fragments representing appropriate sampling positions for rendering the primitives. The fragments generated by the rasteriser 304 are then sent onwards to the rest of the pipeline 300 for processing.

The graphics fragments generated by the rasteriser 304 are then passed to the fragment shader 306 for shading. The output of the fragment shader 306 is a set of appropriately shaded, e.g. colour, values for sampling positions for the tile in question.

The shaded sampling positions from the fragment shader 306 are then processed by a pixel processor 308 to post-process, e.g. down-sample, the rendered sampling positions to provide the sampling position data (pixel data) for the pixels that will actually be output.

The pixel data can then be output to memory 116 via the tile buffer 202, write controller 204 and bus interface 206.

Other arrangements for the graphics processing pipeline 300 would, of course, be possible.

Referring again to FIG. 2, the GPU 106 also comprises signature generating circuitry 208. The signature generating circuitry 208 generates one or more content-representative signatures for each tile of the frame of graphics data that are representative of the contents of that tile. Each signature may comprise a data (e.g. colour) value, a checksum, a CRC, or a hash value, etc., derived from or generated for the data for the tile in question. The signatures for the tiles are written to the memory 116 via the bus interface 206 using the write controller 204.

The GPU 106 also comprises signature comparator circuitry 210 that compares the signatures for tiles for the current frame to the signatures for corresponding tiles in the previous frame. The signature comparator circuitry 210 fetches the signatures for the corresponding tiles in the previous frame using previous frame signature fetch circuitry 212 via the bus interface 206.

The signature comparator circuitry 210 also informs a controller 214 for the GPU pixel generator 200 of the results of the comparisons. The manner in which the controller 214 controls the GPU pixel generator 200 based on the results of the comparisons is discussed in more detail below.

In this embodiment, the signature comparator circuitry 210 also informs the write controller 204 of the results of the comparisons. In this embodiment, the write controller 204 can prevent a tile generated for the current frame from being written out to memory 116, for example when the signature for that tile is the same as a signature for the corresponding tile in the previous frame or when the signature for that tile is the same as a signature for another tile in the current frame. This can reduce the amount of memory bandwidth used in cases where the system 100 does not prevent a similar tile from being generated for the current frame.

Various embodiments in which particular tiles to be generated for a current frame of graphics data can be prevented from being generated will now be described.

Figure 4:
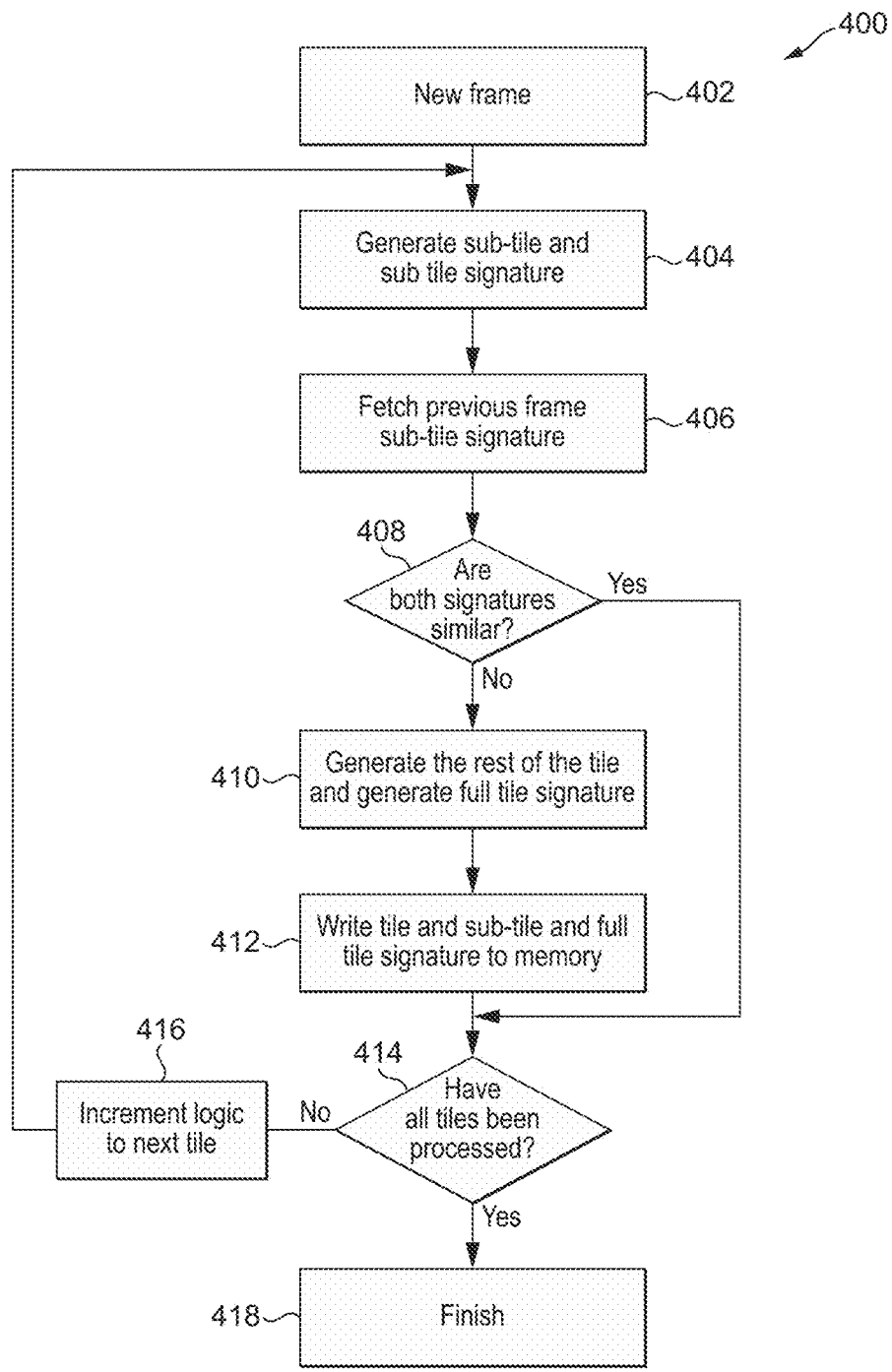
FIG. 4 shows a method of predicting whether a tile to be generated for a current frame will be similar to a tile generated for a previous frame according to an embodiment of the technology described herein.

FIG. 4 shows a process 400 of predicting whether a tile to be generated for a current frame will be similar to a corresponding tile generated for a previous frame according to an embodiment.

The process of generating the current frame of graphics data begins at step 402.

Then, at step 404, a representative subset of data for some but not all of the sampling positions for a tile is generated by the GPU pixel generator 200.

FIGS. 5A-D show several example arrangements for the representative subset of data 502a-d (indicated with shading). In these examples, each tile 500a-d is divided into 16 sub-tiles, with each sub-tile comprising 4×4 sampling positions. In each example shown, the representative subset of data 502a-d is substantially evenly distributed over the tile 500a-d. For example, in FIG. 5C, the representative subset of data 502c forms a checkerboard pattern within the tile 500c. Other sampling patterns can be used as desired.

Referring again to FIG. 4 and step 404, a sub-signature for the representative subset of data for the tile is generated by the signature generator 208.

Figure 5A:
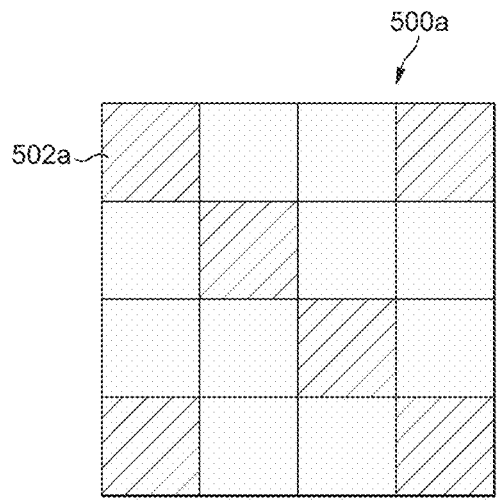
FIGS. 5A-D show various patterns for representative subsets of data for a tile according to embodiments of the technology described herein.
Figure 5B:
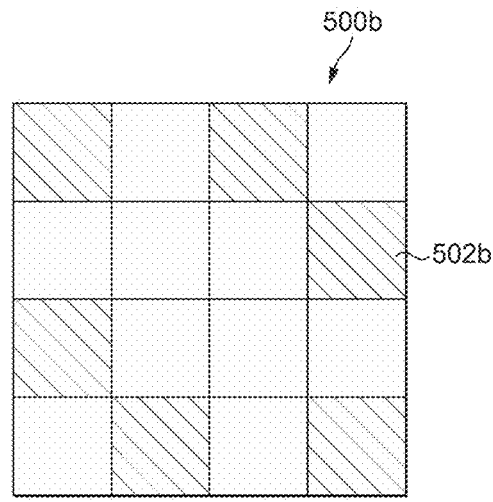
Figure 5C:
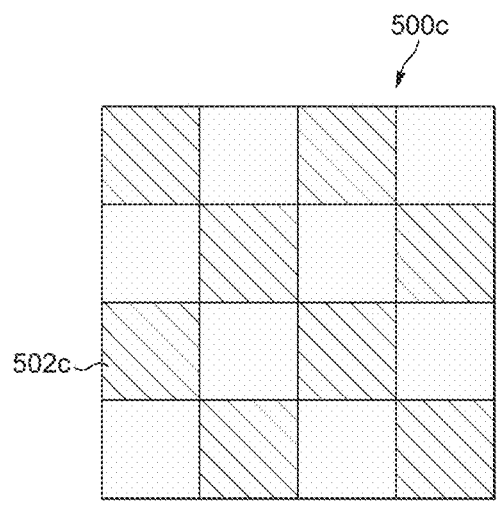
Figure 5D:
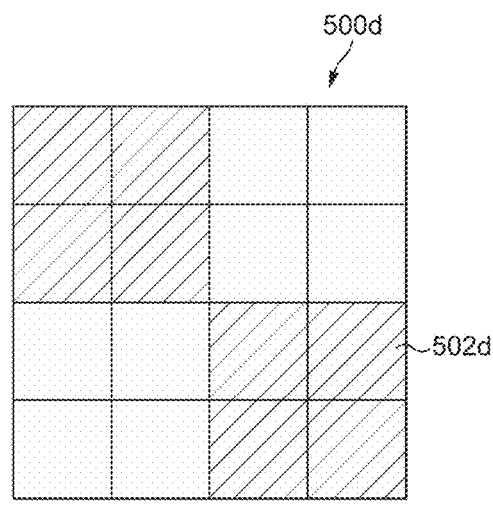
Figures 6A, 6B:
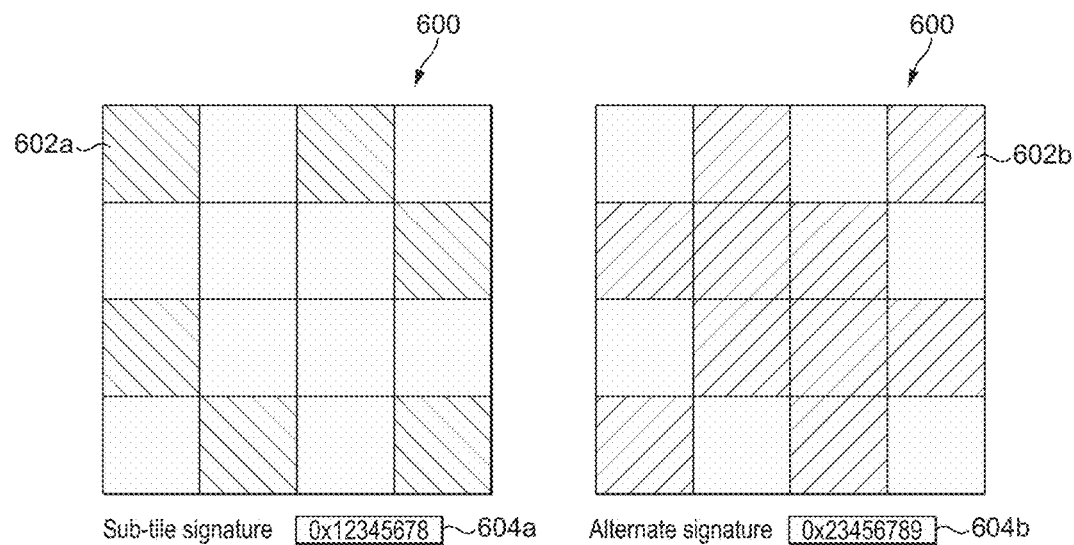
FIGS. 6A-C show patterns for representative and remaining subsets of data for a tile together with content-representative signatures according to an embodiment of the technology described herein.

FIG. 6A shows an example sub-signature 604a for representative subset of data 602a (indicated with shading) of a tile 600 having a sampling pattern similar to that which is shown in FIG. 5B.

Referring again to FIG. 4, at step 406, the corresponding previous sub-signature for the corresponding tile in the previous frame is fetched by the signature comparator 210 using the previous frame signature fetch circuitry 212 via the bus interface 206.

Then, at step 408, the signature comparator 210 determines whether the sub-signatures are similar to one another and outputs the result of the comparison to the controller 214 and write controller 204.

When the sub-signatures are not similar, it is predicted that the tile for the current frame will be different to the corresponding tile in the previous frame. In this case, at step 410, the controller 214 controls the GPU pixel generator 200 to generate the remaining subset of data for the tile so as to generate a full version of the tile.

A full signature for the full tile is also generated by the signature generator 208. In this embodiment, this comprises generating a second sub-signature based on the contents of the remaining subset of data for the tile, and then combining the second sub-signature with the first sub-signature that was generated for the representative subset of data for the tile.

Figure 6C:
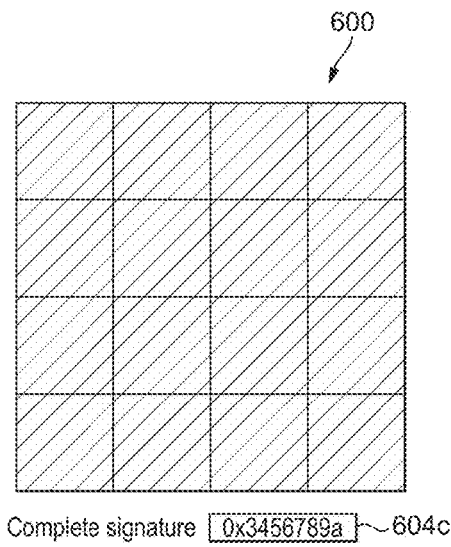

FIG. 6B shows an example sub-signature 604b for the remaining subset of data 602b (indicated with shading) of the tile 600 shown in FIG. 6A. FIG. 6C then shows an example full signature 604c for the tile 600 that is obtained by combining the sub-signature 604a of FIG. 6A and the sub-signature 604b of FIG. 6B.

Referring again to FIG. 4, at step 412, the full tile is written out to memory 116 by the write controller 204 for use in the current frame. The sub-signature and full signature are also written out to memory 116 by the write controller 204 for use when processing subsequent frames.

Conversely, when it is determined at step 408 that the signatures are similar, it is predicted that the tile for the current frame will be similar to the corresponding tile in the previous frame. In this case, the controller 214 controls the GPU pixel generator 200 so as not to generate the remaining subset of data for the tile. In this case, there is also no need to generate a full signature for a full version of the tile, and no need to write a full version of the current tile, a sub-signature or a full signature out to memory, since the full version of the tile, the sub-signature and the full signature for the corresponding tile in the previous frame can be used for the corresponding tile in the next frame instead. Thus, in this case, there can be a significant reduction in the amount of processing power and memory bandwidth used.

At step 414, it is determined whether there are any more tiles of the frame of graphics data left to process. When there are more tiles to process, the processing is incremented to the next tile at step 416, and the process returns to step 404 to process the next tile.

When there are no more tiles to process, the process of generating the frame finishes at step 418. The resultant frame of graphics data stored in the memory 116 can then be read by the display controller 110 and output to the display 118.

FIG. 7A shows an example memory map 700 for the memory 116 comprising the data used during the process of FIG. 4. As is shown in FIG. 7A, the memory 116 stores a list of graphics data 702a for the previous frame, a list of signatures 704a for the previous frame, and a list of sub-signatures 706a for the previous frame, with each entry on each list potentially being used for a particular tile in the current frame and corresponding to a particular corresponding tile in the previous frame.

FIG. 7B shows that the lists of signatures and sub-signatures in the memory map 700 can notionally be stored in the memory 116 respectively as an array of signatures 704b and an array of sub-signatures 706b for the previous frame, with each element of each array potentially being used for a particular tile in the current frame and corresponding to a particular corresponding tile in the previous frame.

FIG. 7C shows a frame buffer 708 of the memory 116 that is used to store the data for the tiles of the frame of output data. The non-shaded areas 710 relate to tiles that were generated in the current frame and the shaded areas 712 relate to tiles that where not generated in the current frame and that accordingly contain data for the corresponding tiles in the previous frame.

Figure 8:
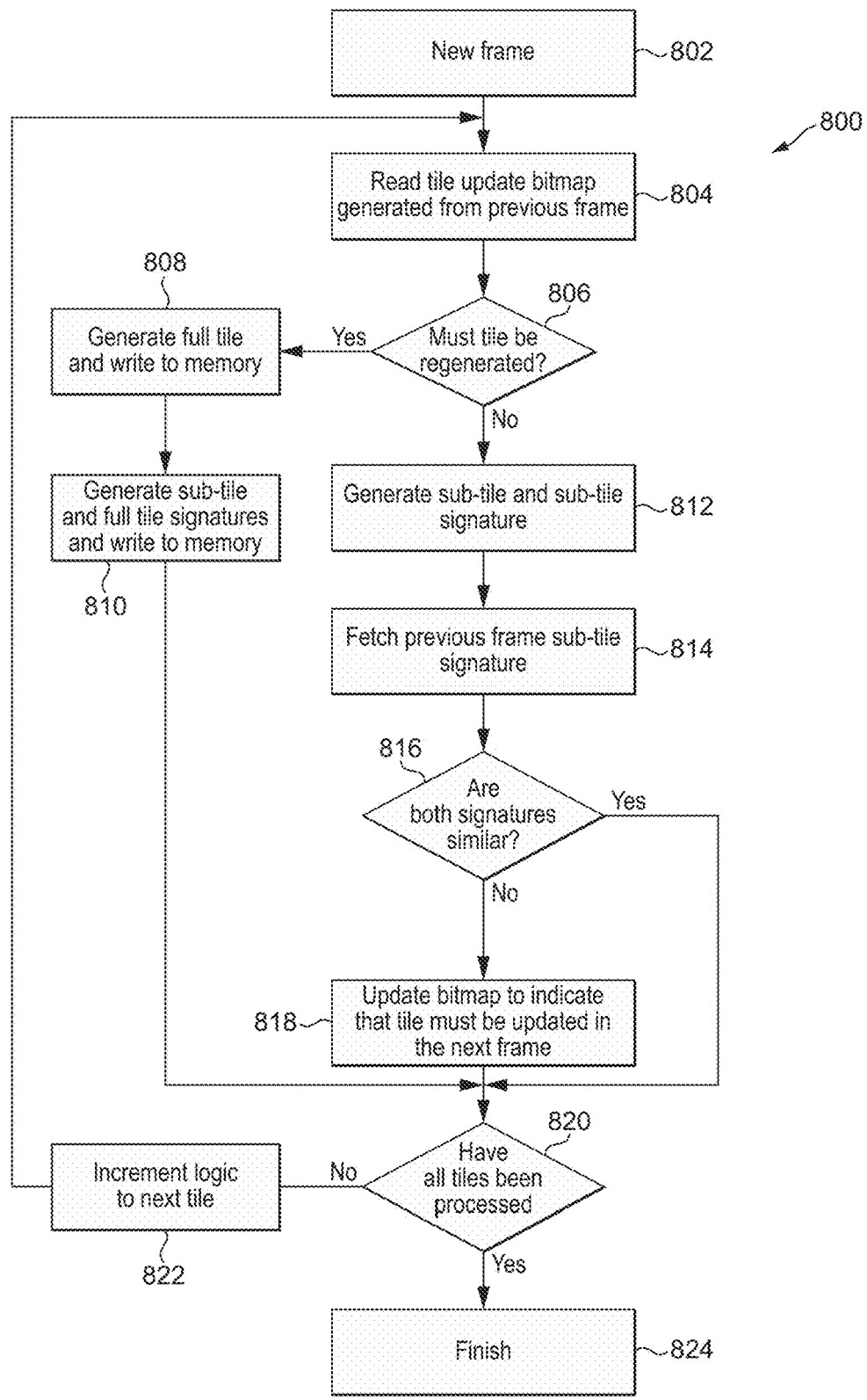
FIG. 8 shows a method of predicting whether a tile to be generated for a current frame will be similar to a tile generated for a previous frame according to another embodiment of the technology described herein.

FIG. 8 shows a process 800 that comprises a step of predicting whether a tile to be generated for a current frame will be similar to a corresponding tile generated for a previous frame according to another embodiment.

In this embodiment, a set of update data in the form of bitmap is stored in the memory 116 and is used to determine whether a particular tile to be generated for the current frame must be generated for the current frame. In this embodiment, the bitmap comprises an entry for each tile of the frame, with each entry comprising a bit that indicates (e.g. with a 1) that the tile must be generated for the current frame or that indicates (e.g. with a 0) that the tile does not need to be generated for the current frame and thus is to be subjected to a step of predicting whether that tile is similar to a corresponding tile generated for the previous frame.

In this embodiment, the bitmap indicates that a tile must be updated unless that tile has not changed within the previous N frames. This embodiment accordingly comprises a parallel process of determining whether each tile has remained unchanged within the previous N frames. When a tile has remained unchanged for the previous N frames, the bit for that tile is set so as to indicate that it is not necessary to generate the tile for the current frame and thus the step of predicting whether the tile is similar to the corresponding tile generated for the previous frame should be made. In this embodiment, N equals 10. Although other values for N could of course be used.

The process of generating the current frame of graphics data begins at step 802.

Then, at step 804, the bitmap for the frame is read to determine whether the tile under consideration must be generated for the current frame.

When it is determined at step 806 that the tile must be generated then, at step 808, the full tile is generated and written to memory 116. Then, at step 810, a sub-signature for a representative subset of data for the tile and a signature for the full tile are generated by the signature generator 208. The sub-signature and full signature are also written out to memory 116 by the write controller 204 for use when processing subsequent frames.

When it is determined at step 806 that the tile does not need to be generated then, at step 812, a representative subset of data for a tile are generated by the GPU pixel generator 200. A sub-signature for the representative subset of data for the tile is also generated by the signature generator 208.

Then, at step 814, the corresponding previous sub-signature for the corresponding tile in the previous frame is fetched by the signature comparator 210 using the previous frame signature fetch circuitry 212.

Then, at step 816, the signature comparator 210 determines whether the sub-signatures are similar to one another and outputs the results of the comparison to the controller 214 and write controller 204.

When the sub-signatures are not similar, it is predicted that the tile for the current frame will be different to the corresponding tile in the previous frame. In this case, at step 818, the bitmap is updated to indicate that the corresponding tile must be generated in the next frame. In this embodiment, in this case, the controller 214 still controls the GPU pixel generator 200 so as not to generate the tile for the current frame. Although this means that the tile, despite probably being different in the current frame, is not updated for the current frame, the corresponding tile will be updated in the next frame and so the fact that the tile has not been updated for the current frame is unlikely to be noticed.

Furthermore, in this case, there is no need to write a full version of the current tile out to memory. There is also no need to generate a full signature for a full version of the tile and no need to write a sub-signature or a full signature out to memory, since no signatures or sub-signatures will be considered for the corresponding tile in the next frame. Thus, in this case, there can be a significant reduction in the amount of processing power and memory bandwidth used.

Conversely, when it is determined at step 816 that the signatures are similar, it is predicted that the tile for the current frame will be similar to the corresponding tile in the previous frame. In this case, the controller 214 again controls the GPU pixel generator 200 so as not to generate the tile for the current frame. In this case, there is again no need to write a full version of the current tile out to memory. There is also again no need to generate a full signature for a full version of the tile and no need to write a sub-signature or a full signature out to memory, since the full version of the tile, the sub-signature and the full signature for the corresponding tile in previous frame can be used instead.

Thus, in this case, there can again be a significant reduction in the amount of processing power and memory bandwidth used.

At step 820, it is determined whether there are any more tiles of the frame of graphics data left to process. When there are more tiles to process, the processing is incremented to the next tile at step 822, and the process returns to step 804 to process the next tile.

When there are no more tiles to process, the process of generating the frame finishes at step 824. The resultant frame of graphics data stored in the memory 116 can then be read by the display controller 110 and output to the display 118.

Figure 9:
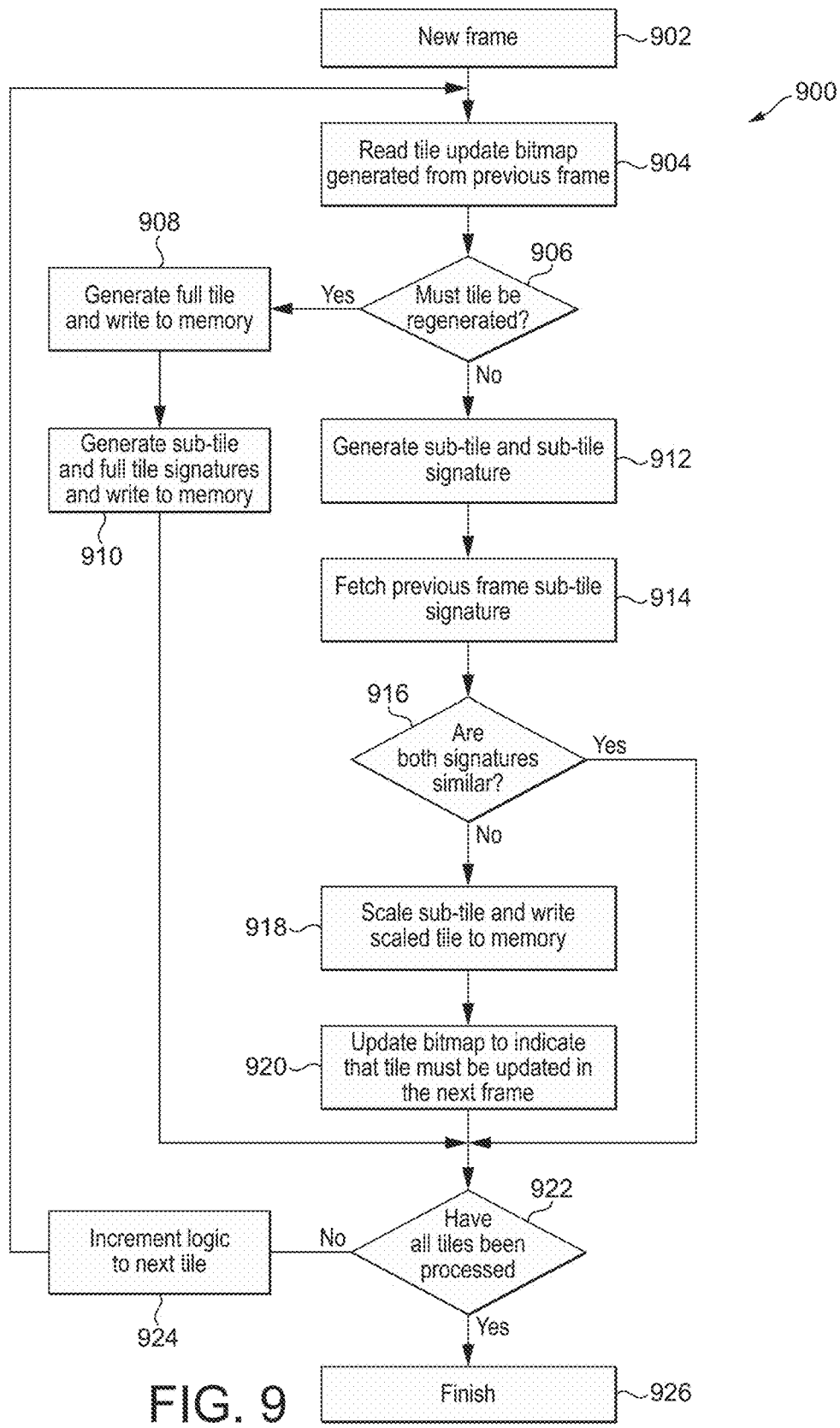
FIG. 9 shows a method of predicting whether a tile to be generated for a current frame will be similar to a tile generated for a previous frame according to yet another embodiment of the technology described herein.

FIG. 9 shows a process 900 that comprises a step of predicting whether a tile to be generated for a current frame will be similar to a tile generated for a previous frame according to yet another embodiment.

In this embodiment, a set of update data in the form of bitmap is again stored in the memory 116 and is used to determine whether a particular tile to be generated for the current frame must be generated for the current frame. In this embodiment, the bitmap again comprises an entry for each tile of the frame, with each entry comprising a bit that indicates (e.g. with a 1) that the tile must be generated for the current frame or that indicates (e.g. with a 0) that the tile does not need to be generated for the current frame and thus is to be subjected to a step of predicting whether that tile is similar to a corresponding tile generated for the previous frame.

In this embodiment, the bitmap again indicates that a tile must be updated unless that tile has not changed within the previous N frames. This embodiment accordingly again comprises a parallel process of determining whether each tile has remained unchanged within the previous N frames. When a tile has remained unchanged for the previous N frames, the bit for that tile is set so as to indicate that it is not necessary to generate the tile for the current frame and thus the step of predicting whether the tile is similar to the corresponding tile generated for the previous frame should be made. In this embodiment, N again equals 10. Although, as mentioned above, other values for N could of course be used.

The process of generating the current frame of graphics data begins at step 902.

Then, at step 904, a bitmap for the frame is read to determine whether the tile under consideration must be generated for the current frame.

When it is determined at step 906 that the tile must be generated then, at step 908, the full tile is generated and written to memory 116. Then, at step 910, a sub-signature for a representative subset of data for the tile and a signature for the full tile are generated by the signature generator 208. The sub-signature and full signature are also written out to memory 116 by the write controller 204 for use when processing subsequent frames.

When it is determined at step 906 that the tile does not need to be generated then, at step 912, a representative subset of data for the tile is generated by the GPU pixel generator 200. A sub-signature for the representative subset of data for the tile is also generated by the signature generator 208.

Then, at step 914, the corresponding previous sub-signature for the corresponding tile in the previous frame is fetched by the signature comparator 210 using the previous frame signature fetch circuitry 212.

Then, at step 916, the signature comparator 210 determines whether the sub-signatures are similar to one another and outputs the results of the comparison to the controller 214 and write controller 204.

When the sub-signatures are not similar, it is predicted that the tile for the current frame will be different to the corresponding tile in the previous frame. In this case, at step 918, the controller 214 controls the GPU pixel generator 200 to scale up the representative subset of data for the tile so as to generate a full up-scaled version of the tile. The full up-scaled tile is then written out to memory 116 by the write controller 204 for use in the current frame.

Then, at step 920, the bitmap is updated to indicate that the corresponding tile must be generated in the next frame. In this case, there is no need to generate a full signature for a full version of the tile and no need to write a sub-signature or a full signature out to memory, since no signatures or sub-signatures will be considered for the corresponding tile in the next frame.

Conversely, when it is determined at step 916 that the signatures are similar, it is predicted that the tile for the current frame will be the same as the corresponding tile in the previous frame. In this case, the controller 214 controls the GPU pixel generator 200 so as not to up-scale the representative subset of data for the tile. In this case, there is no need to write a full version of the current tile out to memory. There is also no need to generate a full signature for a full version of the current tile and no need to write a sub-signature or a full signature out to memory, since the full version of the tile, the sub-signature and the full signature for the corresponding tile in the previous frame can be used instead. Thus, in this case, there can be a significant reduction in the amount of processing power and memory bandwidth used.

At step 922, it is determined whether there are any more tiles of the frame of graphics data left to process. When there are more tiles to process, the processing is incremented to the next tile at step 924, and the process returns to step 904 to process the next tile.

When there are no more tiles to process, the process of generating the frame finishes at step 926. The resultant frame of graphics data stored in the memory 116 can then be read by the display controller 110 and output to the display 118.

In the above embodiments described with reference to FIGS. 8 and 9, a set of update data in the form of a bitmap is used to determine whether or not a tile must be generated based on the previous N frames.

In other embodiments, the bitmap can indicate that a tile must or must not be updated based on a detected update pattern and frame rate. In these other embodiments, where the detected frame rate for a tile is lower than the frame rate currently being used to generate frames (e.g. because the tile relates to lower frame rate video that is being incorporated into the output), and the update pattern indicates that the tile is not due to be updated in the current frame, then the bitmap indicates that the tile must not be updated for the current frame. Conversely, where the detected frame rate for a tile is not lower than the frame rate currently being used to generate frames, or where the detected frame rate for a tile is lower than the frame rate currently being used to generate frames but the update pattern indicates that the tile is due to be updated in the current frame, then the bitmap can indicate that the tile must be updated for the current frame.

In other embodiments, each entry of the update data also or instead comprises a counter that indicates the number of frames for which the tiles have remained unchanged. In these embodiments, the number of sampling positions for the subset of representative data for a tile is selected based on the counter value. In these embodiments, when the counter indicates that corresponding tiles have been similar for at least the previous 10 frames, then a more resource-intensive but more comprehensive prediction is made by using a representative subset of ¼ of the data for the tile when predicting whether the tile to be generated for the current frame will be similar to the tile generated for the previous set of output data. Then, when the counter indicates that corresponding tiles have been similar for at least the previous 50 frames, a less comprehensive but less resource-intensive prediction is made by using a representative subset of 1/16 of the data for the tile when predicting whether the tile to be generated for the current frame will be similar to the tile generated for the previous set of output data.

Figure 10:
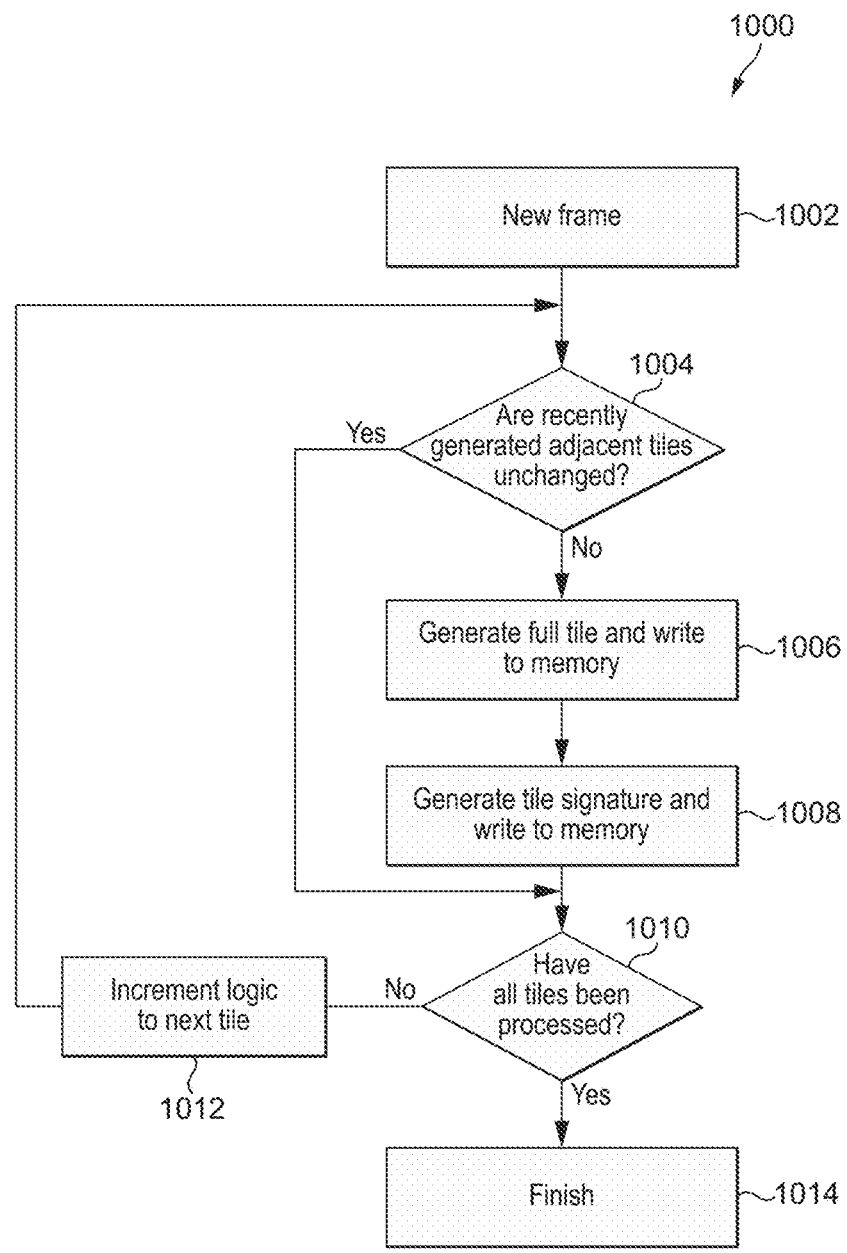
FIG. 10 shows a method of predicting whether a tile to be generated for a current frame will be similar to a tile generated for a previous frame according to yet another embodiment of the technology described herein.

FIG. 10 shows a process 1000 that comprises a step of predicting whether a tile to be generated for a current frame will be similar to a tile generated for a previous frame according to yet another embodiment.

The process of generating the current frame of graphics data begins at step 1002.

Then, at step 1004, it is determined whether one or more other adjacent tiles that have been generated for the current frame are similar to one or more corresponding adjacent tiles that have been generated for the previous frame. In this embodiment, this can comprise the signature comparator 210 comparing signatures for the adjacent tiles to signatures for the corresponding adjacent tiles and outputting the results of the comparisons to the controller 214 and write controller 204.

When the one or more adjacent tiles are not similar to the one or more corresponding adjacent tiles, then it is predicted that the tile for the current frame will be different to the corresponding tile in the previous frame. In this case, at step 1006, the controller 214 controls the GPU pixel generator 200 so as to generate the full tile anew and the full tile is written out to memory 116 by the write controller 204 for use in the current frame. Then, at step 1008, a full signature for the full tile is generated by the signature generator 208 and the full signature is written out to memory 116 by the write controller 204 for use when processing subsequent frames.

Conversely, when the one or more adjacent tiles are similar to the one or more corresponding adjacent tiles, then it is predicted that the tile for the current frame will be the same as the corresponding tile in the previous frame. In this case, the controller 214 controls the GPU pixel generator 200 so as not to generate the tile for the current frame. In this case, there is no need to write a full version of the current tile out to memory. There is also no need to generate a full signature for a full version of the tile and no need to write a full signature out to memory, since the full version of the tile and the full signature for the corresponding tile in the previous frame can be used instead. Thus, in this case, there can again be a significant reduction in the amount of processing power and memory bandwidth used.

At step 1010, it is determined whether there are any more tiles of the frame of graphics data left to process. When there are more tiles to process, the processing is incremented to the next tile at step 1012, and the process returns to step 1004 to process the next tile.

When there are no more tiles to process, the process of generating the frame finishes at step 1014. The resultant frame of graphics data stored in the memory 116 can then be read by the display controller 110 and output to the display 118.

Figure 11:
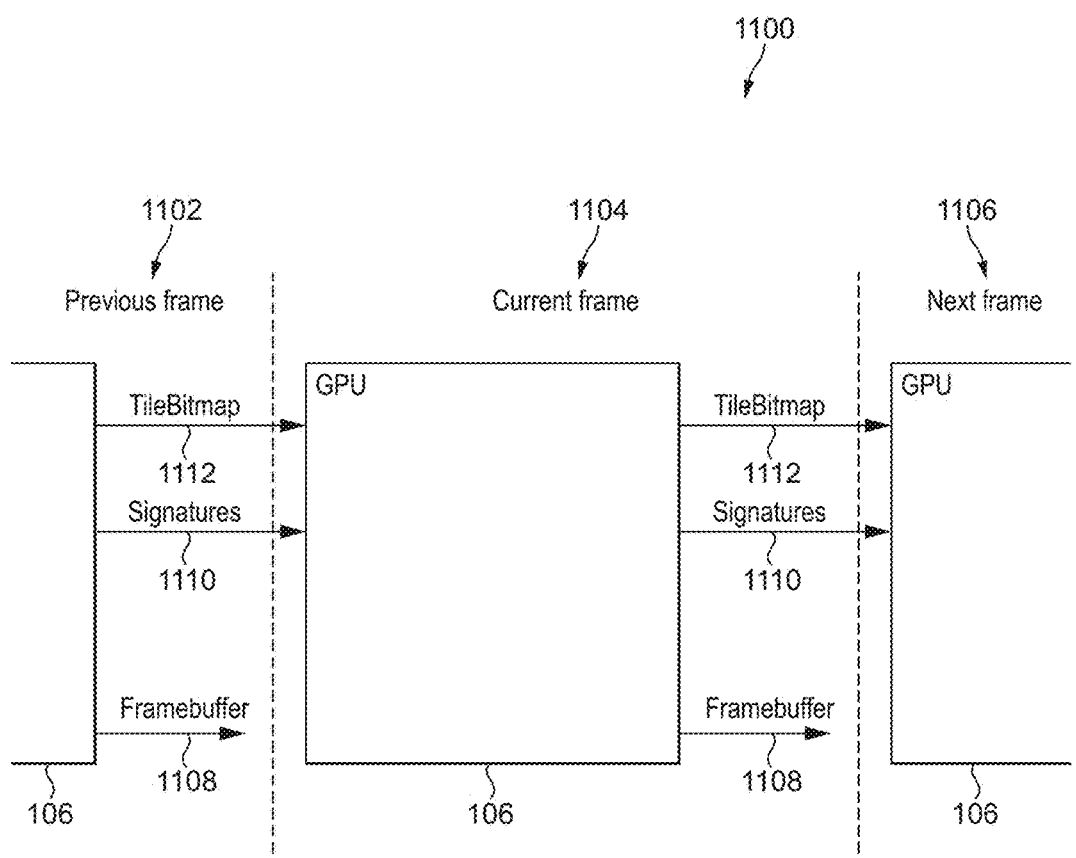
FIG. 11 shows data flow from frame to frame according to embodiments of the technology described herein.

FIG. 11 shows the flow of data 1100 from the previous frame 1102, to the current frame 1104, and to the next frame 1106 in embodiments of the technology described herein.

As is shown in FIG. 11, graphics data 1108 for the tiles which are generated for each frame is output from the GPU 106 to a frame buffer in the memory 116. As will be appreciated from the above, graphics data need not be generated, and therefore need not be output, for some of the tiles of each frame.

In this embodiment, signatures 1110 are also passed from the previous frame 1102 to the current frame 1104 for use by the GPU 106 when considering the tiles of the current frame 1104, and (possibly updated) signatures 1110 are passed from the current frame 1104 to the next frame 1106 for use by the GPU 106 when considering the tiles of the next frame 1106.

In this embodiment, a bitmap 1112 is also passed from the previous frame 1102 to the current frame 1104 for use by the GPU 106 when considering the tiles of the current frame 1104, and a (possibly updated) bitmap 1112 is passed from the current frame 1104 to the next frame 1106 for use by the GPU 106 when considering the tiles of the next frame 1106.

Figure 12:
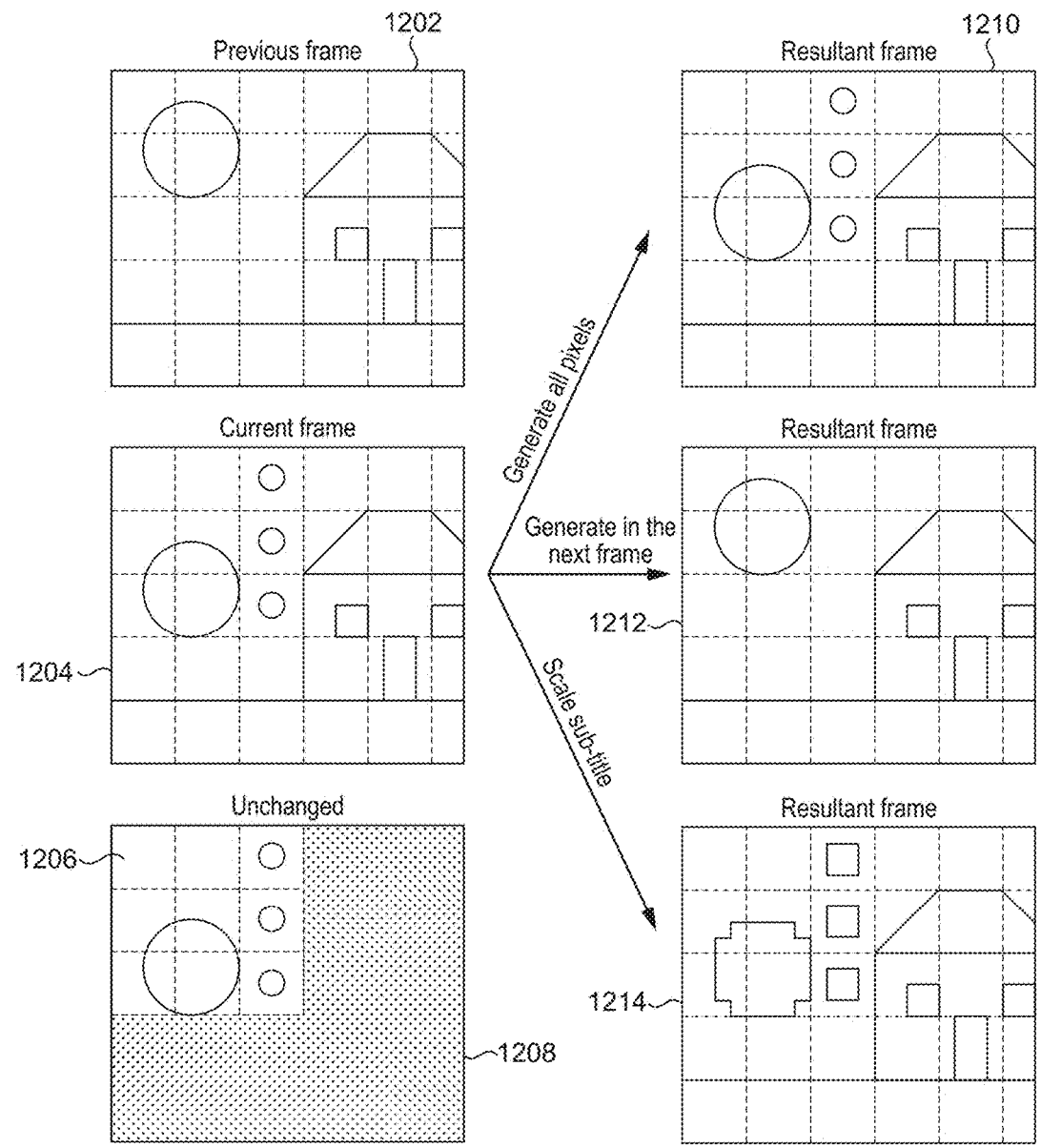
FIG. 12 shows frames of graphics data that have been generated according to embodiments of the technology described herein.

FIG. 12 shows an example of a previous frame 1202 of graphics data and a current frame 1204 of graphics data.

FIG. 12 also shows an area 1206 of tiles that are predicted to change from the previous frame 1202 to the current frame 1204, and an area 1208 of tiles that are predicted not to change from the previous frame 1202 to the current frame 1204. A prediction as to whether the tiles will change can be made in any of the ways described above.

FIG. 12 also shows three example ways in which the resultant current frame can be provided following the prediction.

In the first example, the tiles for the changed area 1206 are generated for the resultant current frame 1210, for example by generating the remaining subset of data for the tiles as per the process described with reference to FIG. 4.

In the second example, the tiles for the changed area 1206 are not generated for the resultant current frame 1212 but are generated for the next frame, for example as per the process described with reference to FIG. 8. Instead, the tiles for that area in the previous frame 1202 are used for the current frame 1212.

In the third example, the tiles for the changed area 1206 are generated for the resultant current frame 1214 by up-scaling the representative subset of tile data generated for the current frame, for example as per the process described with reference to FIG. 9.

In all three examples, the tiles for the static area 1208 are not generated for the current frame 1204. Instead, the corresponding tiles for that area in the previous frame 1202 are used. This can significantly reduce the amount of power and memory bandwidth used to produce the resultant current frame.

It can be seen from the above that embodiments of the technology described herein can provide a way to avoid re-generating static areas of output data. This is achieved in embodiments of the technology described herein by predicting whether a region of output data that has not yet been generated for a current set of output data will be similar to a corresponding region of output data generated for a previous set of output data. When it is predicted that those regions will be similar, the region to be generated for the current set of output data is prevented from being generated and the corresponding region of output data that was generated for the previous set of output data is used instead.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing apparatus comprising:
    predicting whether a region of output data to be generated by the apparatus for a current set of output data will be similar to a region of output data that has been generated for a previous set of output data and stored in a memory for a previous set of output data; and
    when it is predicted that a particular region of output data to be generated by the apparatus for the current set of output data will be similar to a particular region of output data generated for the previous set of output data, preventing the particular region of output data from being generated for the current set of output data and using the particular region of output data generated for the previous set of output data as the particular region of output data for the current set of output data;
    wherein, when it is predicted that a particular region of output data to be generated for the current set of output data will not be similar to a particular region of output data generated for the previous set of output data, the particular region of output data to be generated for the current set of output data is not generated for the current set of output data or the particular region of output data generated for the previous set of output data is used as the particular region of output data for the current set of output data or a corresponding region of output data to be generated for a subsequent set of output data is generated for the subsequent set of output data.

2. A method as claimed in claim 1, wherein predicting whether the region of output data to be generated for the current set of output data will be similar to the region of output data generated for the previous set of output data comprises:
    generating a representative subset of data for the region of output data to be generated for the current set of output data; and
    determining whether the representative subset of data for the region of output data to be generated for the current set of output data is similar to a representative subset of data for the region of output data generated for the previous set of output data.

3. A method as claimed in claim 1, wherein predicting whether the region of output data to be generated for the current set of output data will be similar to the region of output data generated for the previous set of output data comprises:
    determining whether one or more other regions of output data generated for the current set of output data are similar to one or more other regions of output data generated for the previous set of output data.

4. A method as claimed in claim 1, wherein predicting whether the region of output data to be generated for the current set of output data will be similar to the region of output data generated for the previous set of output data comprises:
    detecting an update pattern that indicates that the region of output data to be generated for the current set of output data will be similar to the region of output data generated for the previous set of output data.

5. A method as claimed in claim 1, wherein predicting whether the region of output data to be generated for the current set of output data will be similar to the region of output data generated for the previous set of output data comprises:
    determining whether regions of output data that were generated for plural previous sets of output data were similar to one another.

6. A method as claimed in claim 1, wherein, when it is predicted that a particular region of output data to be generated for the current set of output data will not be similar to a particular region of output data generated for the previous set of output data, the particular region of output data is generated and used for the current set of output data.

7. A method as claimed in claim 6, wherein a representative subset of data for the particular region to be generated for the current set of output data is generated, and wherein generating the particular region of output data for the current set of output data comprises:
    up-scaling the representative subset of data for the particular region so as to generate the output data for the particular region of output data for the current set of output data; or
    generating the remaining subset of data for the particular region so as to generate the output data for the particular region of output data for the current set of output data.

8. A method as claimed in claim 1, wherein a content-representative signature for the region of output data is used when predicting whether the region of output data to be generated for the current set of output data will be similar to the region of output data generated for the previous set of output data.

9. A method as claimed in claim 1, wherein the region of output data to be generated for the current set of output data and the region of output data generated for the previous set of output data each comprise a processing tile.

10. A data processing apparatus comprising:
    write controller circuitry configured to store output data generated by the apparatus in a memory; and
    processing circuitry configured to:
        predict whether a region of output data to be generated by the apparatus for a current set of output data will be similar to a region of output data that has been generated for a previous set of output data and stored in the memory for a previous set of output data; and
        when it is predicted that a particular region of output data to be generated by the apparatus for the current set of output data will be similar to a particular region of output data generated for the previous set of output data, prevent the particular region of output data from being generated for the current set of output data and use the particular region of output data generated for the previous set of output data as the particular region of output data for the current set of output data;
        wherein, when it is predicted that a particular region of output data to be generated for the current set of output data will not be similar to a particular region of output data generated for the previous set of output data, the processing circuitry is configured not to generate the particular region of output data to be generated for the current set of output data or is configured to use the particular region of output data generated for the previous set of output data as the particular region of output data for the current set of output data or is configured to generate for a subsequent set of output data a corresponding region of output data to be generated for the subsequent set of output data.

11. A data processing apparatus as claimed in claim 10, wherein, when predicting whether the region of output data to be generated for the current set of output data will be similar to the region of output data generated for the previous set of output data, the processing circuitry is configured to:
   generate a representative subset of data for the region of output data to be generated for the current set of output data; and
   determine whether the representative subset of data for the region of output data to be generated for the current set of output data is similar to a representative subset of data for the region of output data generated for the previous set of output data.

12. A data processing apparatus as claimed in claim 10, wherein, when predicting whether the region of output data to be generated for the current set of output data will be similar to the region of output data generated for the previous set of output data, the processing circuitry is configured to:
   determine whether one or more other regions of output data generated for the current set of output data are similar to one or more other regions of output data generated for the previous set of output data.

13. A data processing apparatus as claimed in claim 10, wherein, when predicting whether the region of output data to be generated for the current set of output data will be similar to the region of output data generated for the previous set of output data, the processing circuitry is configured to:
   detect an update pattern that indicates that the region of output data to be generated for the current set of output data will be similar to the region of output data generated for the previous set of output data.

14. A data processing apparatus as claimed in claim 10, wherein, when predicting whether the region of output data to be generated for the current set of output data will be similar to the region of output data generated for the previous set of output data, the processing circuitry is configured to:
   determine whether regions of output data that were generated for plural previous sets of output data were similar to one another.

15. A data processing apparatus as claimed in claim 10, wherein, when it is predicted that a particular region of output data to be generated for the current set of output data will not be similar to a particular region of output data generated for the previous set of output data, the processing circuitry is configured to generate the particular region of output data and use the particular region of output data for the current set of output data.

16. A data processing apparatus as claimed in claim 15, wherein a representative subset of data for the particular region to be generated for the current set of output data is generated, and wherein, when generating the particular region of output data for the current set of output data, the processing circuitry is configured to:
   up-scale the representative subset of data for the particular region so as to generate the output data for the particular region of output data for the current set of output data; or
   generate the remaining subset of data for the particular region so as to generate the output data for the particular region of output data for the current set of output data.

17. A data processing apparatus as claimed in claim 10, wherein the processing circuitry is configured to use a content-representative signature for the region of output data when predicting whether the region of output data to be generated for the current set of output data will be similar to the region of output data generated for the previous set of output data.

18. A non-transitory computer readable storage medium storing computer software code which when executing on one or more processors of a data processing apparatus performs a method comprising:
   predicting whether a region of output data to be generated by the apparatus for a current set of output data will be similar to a region of output data that has been generated for a previous set of output data and stored in a memory for a previous set of output data; and
   when it is predicted that a particular region of output data to be generated by the apparatus for the current set of output data will be similar to a particular region of output data generated for the previous set of output data, preventing the particular region of output data from being generated for the current set of output data and using the particular region of output data generated for the previous set of output data as the particular region of output data for the current set of output data;
   wherein, when it is predicted that a particular region of output data to be generated for the current set of output data will not be similar to a particular region of output data generated for the previous set of output data, the processing circuitry is configured not to generate the particular region of output data to be generated for the current set of output data or is configured to use the particular region of output data generated for the previous set of output data as the particular region of output data for the current set of output data or is configured to generate for a subsequent set of output data a corresponding region of output data to be generated for the subsequent set of output data.

* * * * *